US011167409B2

(12) United States Patent
Lee et al.

(10) Patent No.: US 11,167,409 B2
(45) Date of Patent: Nov. 9, 2021

(54) ACTION ROBOT

(71) Applicant: LG ELECTRONICS INC., Seoul (KR)

(72) Inventors: Wonhee Lee, Seoul (KR); Sanghun Kim, Seoul (KR); Seungmin Baek, Seoul (KR)

(73) Assignee: LG ELECTRONICS INC., Seoul (KR)

(*) Notice: Subject to any disclaimer, the term of this patent is extended or adjusted under 35 U.S.C. 154(b) by 114 days.

(21) Appl. No.: 16/775,553

(22) Filed: Jan. 29, 2020

(65) Prior Publication Data
US 2020/0238502 A1 Jul. 30, 2020

Related U.S. Application Data

(63) Continuation of application No. PCT/KR2019/001203, filed on Jan. 29, 2019.

(51) Int. Cl.
*A63H 13/00* (2006.01)
*B25J 9/10* (2006.01)
(Continued)

(52) U.S. Cl.
CPC ............ *B25J 9/0006* (2013.01); *A63H 13/00* (2013.01); *A63H 29/22* (2013.01); *B25J 9/104* (2013.01); *B25J 17/00* (2013.01); *B25J 18/00* (2013.01)

(58) Field of Classification Search
CPC . B25J 9/0009; B25J 9/104; B25J 17/00; B25J 18/00; A63H 3/46; A63H 13/02; A63H 13/04; A63H 29/22
See application file for complete search history.

(56) References Cited

U.S. PATENT DOCUMENTS 5,046,987 A 9/1991 Djordjevic
6,913,627 B2 * 7/2005 Matsuda .............. B25J 15/0009
623/64
(Continued)

FOREIGN PATENT DOCUMENTS

CN 102610116 7/2012
KR 10-2006-0041814 5/2006
(Continued)

OTHER PUBLICATIONS

International Search Report dated Nov. 5, 2019 issued in Application No. PCT/KR2019/001203.
(Continued)

*Primary Examiner* — Bobby Rushing, Jr.
(74) *Attorney, Agent, or Firm* — KED & Associates LLP

(57) ABSTRACT

An action robot may include a main body, at least one joint, and at least one limb configured to be rotatably connected to the main body via the joint. The joint may be configured to provide elastic force in a direction in which the limb is unfolded or pulled away from the main body and a wire connected to the limb to pull the limb in a direction in which the limb is folded or pulled toward the main body. The wire may be connected to an elevation rod provided inside the main body. A drive assembly may be provided outside the main body and be configured to lift the elevation rod. A rod spring may be provided and configured to provide a downward elastic force to the elevation rod. A wire support provided within the main body may be configured to support the wire.

20 Claims, 17 Drawing Sheets

(51) Int. Cl.
*B25J 9/00* (2006.01)
*B25J 17/00* (2006.01)
*B25J 18/00* (2006.01)
*A63H 29/22* (2006.01)

(56) References Cited

U.S. PATENT DOCUMENTS

| | | | | |
|---|---|---|---|---|
| 7,222,904 | B2* | 5/2007 | Matsuda | B25J 9/104 |
| | | | | 294/106 |
| 8,157,305 | B2* | 4/2012 | Okazaki | B25J 15/0206 |
| | | | | 294/111 |
| 8,910,984 | B2* | 12/2014 | Akae | B25J 9/104 |
| | | | | 294/111 |
| 2007/0035143 | A1* | 2/2007 | Blackwell | B25J 15/0009 |
| | | | | 294/111 |
| 2015/0165621 | A1 | 6/2015 | Ko et al. | |
| 2017/0162088 | A1* | 6/2017 | Kasuga | A63H 3/36 |
| 2018/0221779 | A1* | 8/2018 | Kasuga | A63H 31/10 |
| 2018/0263719 | A1* | 9/2018 | Choi | B25J 9/1045 |

FOREIGN PATENT DOCUMENTS

| KR | 10-2012-0082219 | 7/2012 |
|---|---|---|
| KR | 10-1510019 | 4/2015 |

OTHER PUBLICATIONS

Written Opinion dated Nov. 5, 2019 issued in Application No. PCT/KR2019/001203.

* cited by examiner

ACTION ROBOT

CROSS-REFERENCE TO RELATED APPLICATIONS

This application is a continuation application of PCT Application No. PCT/KR2019/001,203, filed on Jan. 29, 2019, whose entire disclosure is hereby incorporated by reference.

BACKGROUND

1. Field

The present disclosure relates to an action robot.

2. Background

Interest in entertainment robots is increasing, and techniques that allow robots to dance to music or to mimic facial expressions in line with stories such as fairy tales are being developed. Such developments include modularizing joints or wheels. A plurality of actuator modules may be electrically and mechanically connected and assembled to provide various forms of robots such as dogs, dinosaurs, humans, and spiders. A robot manufactured by assembling the plurality of actuator modules is commonly called a modular robot. Each of the actuator modules constituting the modular robot may be provided with a motor to execute a motion or movement according to rotation of the motor. Such movements may be combined to create a dance, mimic facial expressions, or to play out other motion sequences.

A plurality of motions that are suitable for music, stories, etc. may be previously set, predetermined, or programmed, and when the music or story is played from an external device, the robot may perform corresponding motions by executing the preset motions. Such robots may be called action robots.

However, the action robot according to the related art has a large and clunky size due to the plurality of actuator modules, motors, and other components to implement the preset sequence of motions. Therefore, there is a need for a more compact or smaller sized action robot.

BRIEF DESCRIPTION OF THE DRAWINGS

The embodiments will be described in detail with reference to the following drawings in which like reference numerals refer to like elements wherein.

DETAILED DESCRIPTION OF THE EMBODIMENTS

Figure 1:
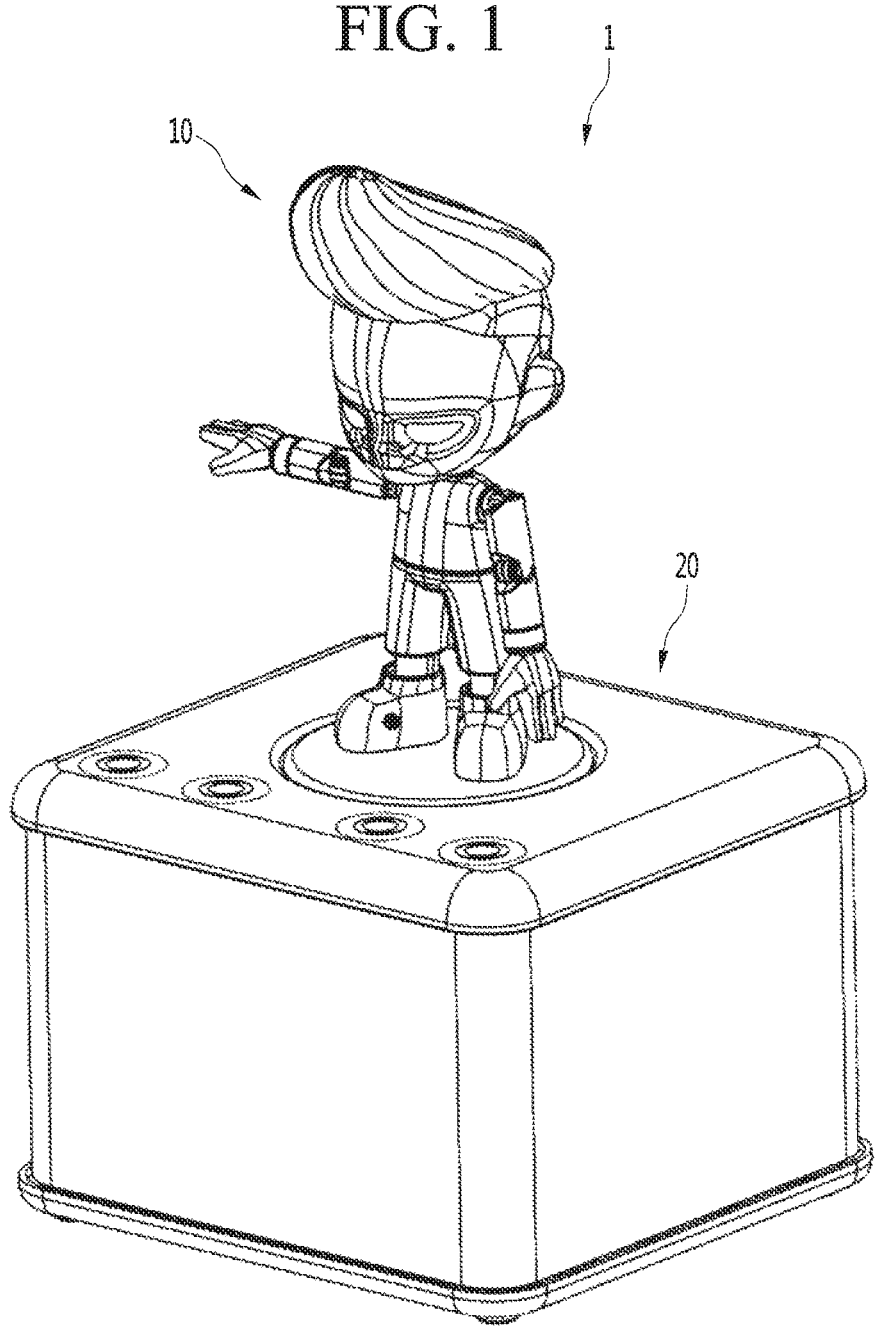
FIG. 1 is a perspective view of an action robot including a robot module or assembly and a base module or assembly according to an embodiment.
Figure 2:
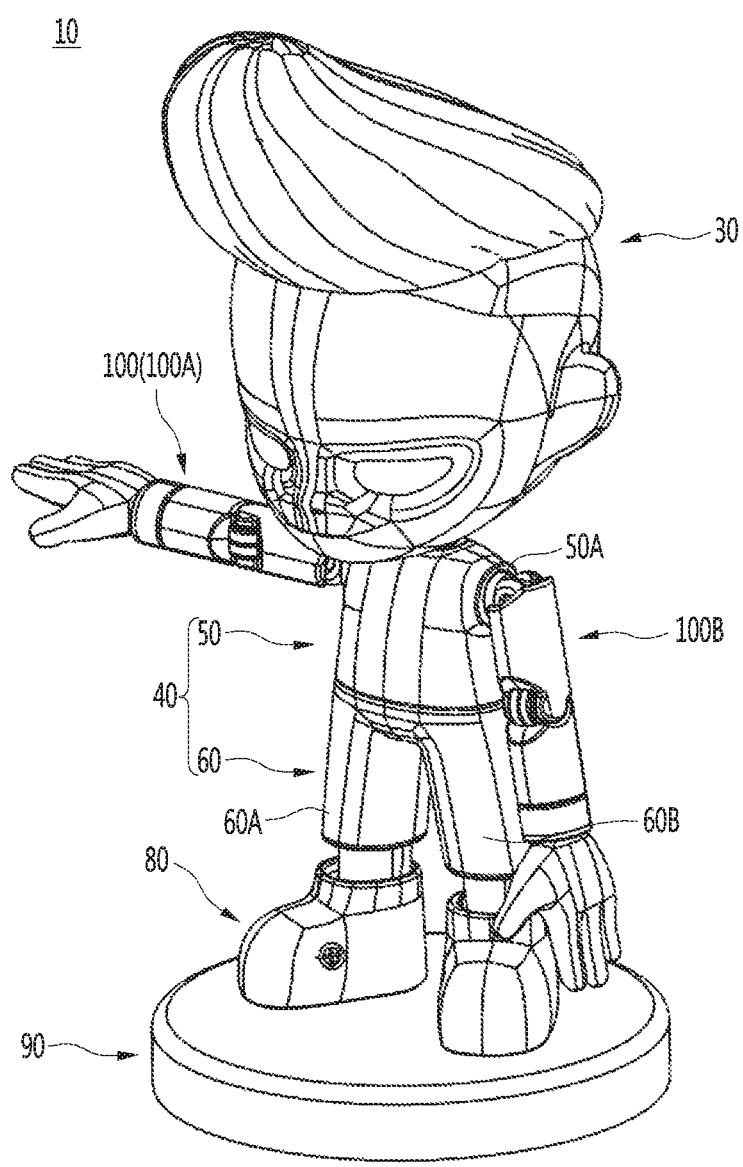
FIG. 2 is a perspective view of the robot assembly according to an embodiment.

Referring to FIGS. 1 and 2, an action robot assembly 1 according to an embodiment may include a robot 10 and a base 20 supporting a bottom of the robot 10. The robot 10 may be configured to move or dance, while motors or actuators driving a movement of the robot 10 may be provided in the base 20.

The robot 10 may have a shape that resembles a person's body, but embodiments disclosed herein are not limited to such a robot 10. The robot 10 may, for example, have a shape that resembles an animal body, an alien, a tree, or other character. For convenience of description, an embodiment where the robot 10 represents a human-like character will be described herein.

The robot 10 may include a head 30, a main body 40, an arm 100, a foot 80, and a sub-base or stand 90. The foot 80 may be fixed to the stand 90, and the stand 90 may rotate with respect to the base 20. The main body 40 may be shaped to include legs. However, embodiments disclosed herein are not limited to these sections. For example, an alternative robot 10 may include a leg that is not part of the main body 40 but moves relative to the main body 40.

The head 30 may have a shape corresponding to a person's head and include eyes, ears, a nose, a mouth, hair, etc. The head 30 may include an optional neck or joint. A bottom of the head 30 may be connected to an upper side or top of the main body 40.

The main body 40 may have a shape corresponding to a person's body and resemble a person's shoulders, a torso, etc. The main body 40 may also include a shape to resemble a person's legs, but embodiments disclosed herein are not limited hereto. A bottom of the main body 40 or the foot 80 may be fixed to the stand 90 so that the main body 40 does not to move relative to the stand 90. The main body 40 may be at least partially hollow to include an interior space in which various devices described later may be provided.

The main body 40 may include an upper body 50 and a lower body 60. An inner space of the upper body 50 and an inner space of the lower body 60 may communicate with each other.

The upper body 50 may have a shape corresponding to a person's upper body and may be shaped to resemble shoulders and a torso or abdomen. Although an arm 100 is represented as being a separate limb connected to the upper body 50 in the figured, embodiments disclosed herein are not limited hereto. For example, the upper body 50 may be shaped to include an arm, and instead, the robot 10 may include a leg or other limbs that move similarly to the arm 100 described herein.

The arm 100 may resemble a human arm and be connected to an upper side of the upper body 50. The upper body 50 may include arm connection holes or sockets 50A to which the arm 100 may be rotatably connected to be moveable. The arm 100 may include first and second (i.e., right and left) arms 100A and 100B at first and second (i.e., right and left) sides of the upper body 50, and the upper body 50 may include two corresponding arm connection holes 50A. The right arm 100A and the left arm 100B may be independently controlled to move independently with respect to each.

The lower body 60 may have a shape corresponding to a person's lower body and may be shaped to resemble human legs, ankles, glutes, etc. The lower body 60 may include a pair of first and second (e.g., right and left) legs 60A and 60B.

The upper body 50 and the lower body 60 may be separably formed and then coupled (e.g., pressed-fit, screwed, adhered, or bonded) to each other. The upper body 50 may be configured to be separated from the lower body 60 by pulling or lifting. Such a coupling may be configured to simplify a construction of the main body 40 and allow easy repairs to any devices provided inside the inner space of the main body 40.

The foot 80 may be connected to lower ends of the right and left legs 60A and 60B. The foot 80 may be supported by and fixed to the stand 90. The stand 90 may be provided on top of the base 20 so that the base 20 supports a lower side of the stand 90.

The stand 90 may have a substantially circular plate shape and rotate with respect to the base 20. The head 30, main body 40, foot 80, and arms 100 may rotate with a rotation of the stand 90, and the entire robot 10 may rotate with respect to the base 20.

A controller to control an overall operation of the action robot 1, a battery to store power to operate the action robot 1, and a driving source or assembly 21 (FIG. 8) that drives an operation of the robot 10 may be provided in the base 20. The base 20 may include a speaker to emit sound to correspond to a movement of the robot 10. The base 20 may include a user interface (e.g., an on/off button or touch screen) and optionally include other output devices such as a display or light emitting diode. Alternatively, the action robot 1 may have a communication module so as to be controlled via a remote device or mobile or web application.

Figure 3:
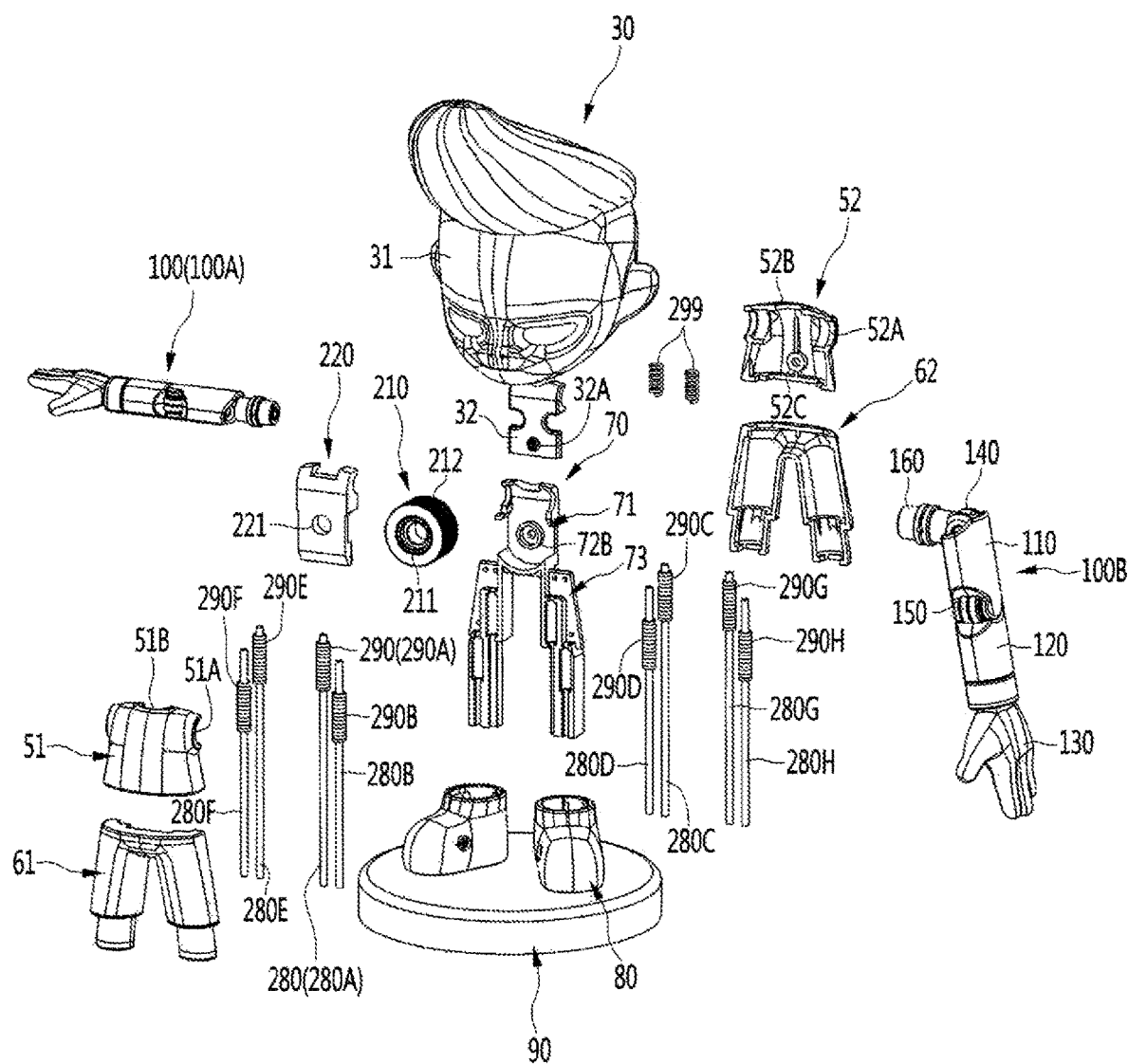
FIG. 3 is an exploded perspective view of the robot assembly according to an embodiment.

Referring to FIG. 3, the upper body 50 may include a front upper body 51 and a rear upper body 5 configured to be detachably coupled (e.g., pressed-fit, screwed, or adhered) to each other in a front-rear direction. An inner space of the upper body 50 may be defined between the front upper body 51 and the rear upper body 52. The lower body 60 may include a front lower body 61 and a rear lower body 62 configured to be detachably coupled (e.g., pressed-fit, screwed, or adhered) to each other in a front-rear direction. An inner space of the lower body 60 may be defined between the front lower body 61 and the rear lower body 62. However, embodiments disclosed herein are not limited hereto. For example, the lower body 60 may alternatively be formed integrally, while the upper body 50 may include front and rear upper bodies 51 and 52. As another alternative, the upper body 50 may be formed integrally, while the lower body 60 may include front and rear lower bodies 61 and 62.

First and second (i.e., right and left) sides of the front upper body 51 may each include a first arm connection groove or arc 51A while first and second sides of the rear upper body 51 may each include a second arm connection groove or arc 52A. When the front upper body 51 and the rear upper body 52 are coupled to each other, the first arm connection groove 51A and the second arm connection groove 52A may define the arm connection hole 50A (FIG. 2).

A top of the front upper body 51 may include a first head connection groove or arc 51B, and a top of the rear upper body 52 may include a second head connection groove or arc 52B. When the front upper body 51 and the rear upper body 52 are coupled to each other, the first head connection groove 51B and the second head connection groove 52B may define a head connection hole to which a bottom of the head 30 and/or an optional neck portion may be connected. The head 30 may be fixed into the head connection hole, or alternatively may be configured to move (e.g., bobble or rotate) within the head connection hole.

The head 30 may include a head body 31 and an attachment frame or neck 32 coupled to a bottom of the head body 31. The attachment frame 32 may have a size configured to pass through the head connection holes 51B and 52B to be provided inside the inner space of the upper body 50. The attachment frame 32 may fix the head body 31 to the upper body 50 so that the head body 31 is provided above the upper body 50.

As an example, the attachment frame 32 may include a groove that is coupled to a rod extending below the head body 31, but embodiments disclosed herein are not limited hereto. Sides of the attachment frame 32 may include avoidance grooves or holes so as to avoid interference with other devices provided inside the inner space of the upper body 50. The attachment frame 32 may be secured to an inner cover 220 (or alternatively, an inner frame 70) of the main body 40, which will be described later.

Each arm 100 may include an upper arm 110, a forearm or lower arm 120, and a hand 130. Each arm 100 may further include a first shoulder joint 140, an elbow joint 150, and a second shoulder joint 160. The right arm 100A and the left arm 100B may have the same configuration.

Embodiments disclosed herein are not limited to first and second shoulder joints 140 and 160 and an elbow joint 150. For example, any one of the first shoulder joint 140, elbow joint 150, and second shoulder joint 160 may be omitted. Alternatively, the arm 100 may include a wrist joint, finger joints, or a third shoulder joint so that the arm may move or rotate in three direction with respect to the upper body 50. As another alternative, the first and second legs 60A and 60B may include knee joints, hip joints, or ankle joints.

The joints 140, 150, and 160 of the arm 100 may be used to implement various operations. The first and second shoulder joints 140 and 160 may allow movement of the upper arm 110 with respect to the upper body 50, and the elbow joint 150 may allow movement of the forearm 120 with respect to the upper arm 110.

The upper arm 110 may be shaped to correspond to a portion of the arm 100 between a shoulder and an elbow of a person's arm. The upper arm 110 may have a shape to resemble a person's biceps, triceps, and/or a person's brachium. The forearm 120 may be shaped to correspond to a portion of the arm 100 between an elbow and a wrist of a person's arm. The forearm 120 may be shaped to resemble a person's forearm. The hand 130 may be shaped to correspond to a person's hand (including palm and fingers) and wrist.

The first shoulder joint 140 may allow the upper arm 110 to rotate or pivot outward and inward with respect to the main body 40. If the second shoulder joint 160 remains unchanged and the upper arm 110 is positioned to be in a frontal plane of motion, a movement of the first shoulder joint 140 may allow abduction and adduction of the arm 100 to appear to spread or tighten an armpit. The left arm 100B in FIG. 3 may exemplify a first position of the arm 100, while the right arm 110A in FIG. 3 may exemplify a second position that the arm 100 may rotate to via the first shoulder joint 140.

The elbow joint 150 may allow the forearm 120 to rotate or pivot toward and away from the upper arm 110 to appear to bend or unbend an elbow. The forearm 120 may rotate to fold or unfold the arm 100.

The second shoulder joint 160 may allow the first shoulder joint 140 to rotate, pivot or twist with respect to the main body 40. A rotation axis of the second shoulder joint 160 may be perpendicular to a rotation axis of the first shoulder joint 140. The rotation axis of the first shoulder joint 140 may be run in a front-rear direction, and the rotation axis of the second shoulder joint 160 may be run in a left-right direction.

Figure 16:
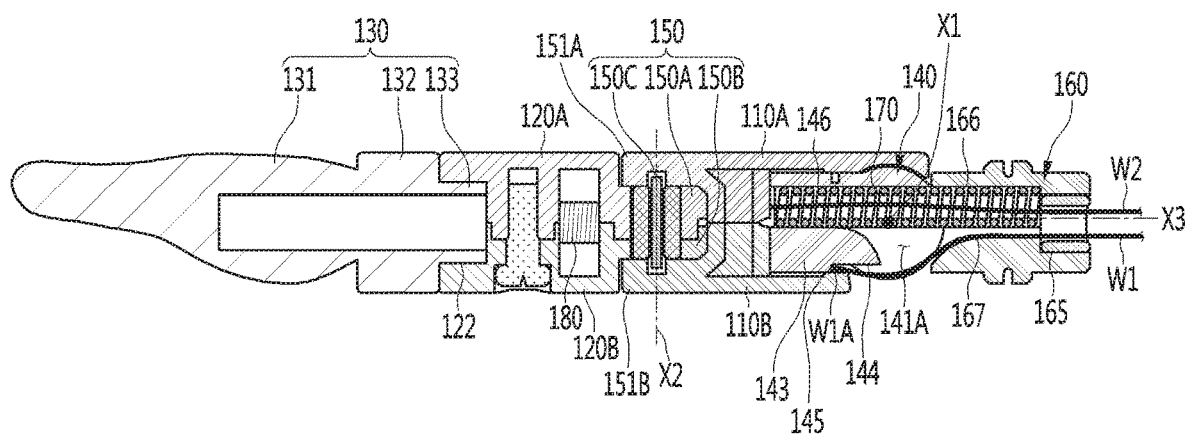
FIG. 16 is a cross-sectional view of the arm assembly from a direction perpendicular to a rotation axis of a first shoulder joint.
Figure 17:
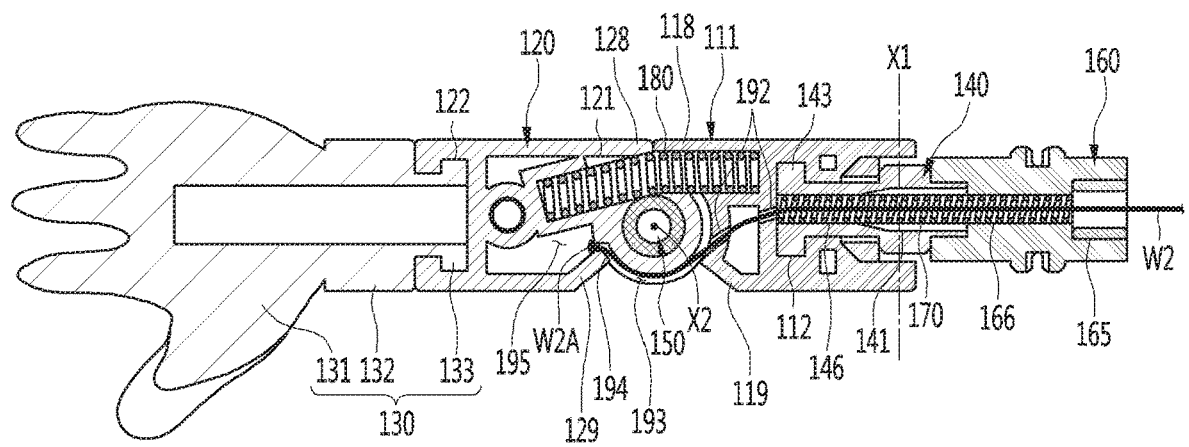
FIG. 17 is a cross-sectional view of the arm assembly from a direction perpendicular to a rotation axis of an elbow joint.

When the upper arm 110 and forearm 120 are extended horizontally outward from the upper body 50 to be perpendicular to a vertical axis (as shown by the right arm 110A in FIG. 3), then a rotation of the first shoulder joint 140 around the second shoulder joint 160 may serve to twist the right arm 110A so as to change a direction a palm of the hand 130 is facing (e.g., compare FIG. 16 and FIG. 17). When the upper arm 110 and forearm 120 are extended vertically at a side of the upper body 50 to be parallel to the vertical axis (as shown by the left arm 100B in FIG. 3), then a rotation of the first shoulder joint 140 around the second shoulder joint 160 may serve to rotate or pivot the left arm 100B forward and backward or up and down in a sagittal plane of motion.

The robot 10 may further include an inner frame 70 provided inside the main body 40, a wire support or support 210, and at least one rod 280 described later. The inner frame 70 may guide an operation of the rod 280 and support the head 30 and the wire support 210. The inner frame 70 may include a body frame 71 at least partially provided inside the upper body 50 and a pair of leg frames 73 extending from the body frame 71 and at least partially provided inside the lower body 60. A lower end of the leg frame 73 may be provided inside of the foot 80. A detailed description of the inner frame 70 will be described in detail with reference to FIG. 4.

The robot 10 may further include a rod 280 at least partially provided inside the main body 40. The rod 280 may extend from the inner space of the lower body 60 and pass through inner spaces of the foot 80 and the stand 90 to an inner space of the base 20 (FIG. 1). The rod 280 may be elevated by the driving assembly 21 (FIG. 8) provided in the base 20 and may alternatively be referred to as an elevation rod.

There may be a plurality of rods 280 to correspond to a plurality of motions of the limbs. A number of rods 280 may equal or exceed a number of joints, however, embodiments disclosed herein are not limited hereto. For example, a number of joints may equal or exceed a number of rods 280 if one rod 280 is configured to correspond to a plurality of joints. The plurality of rods 280 may include a first rod 280A, a second rod 280B, a third rod 280C, a fourth rod 280D, and a fifth rod 280E, a sixth rod 280F, a seventh rod 280G, and an eighth rod 280H.

Each of the rods 280 may be guided by the leg frame 73 of the inner frame 70. The leg frame 73 may include first and second (i.e., right and left) sides or sections to correspond to first and second legs 60A and 60B. The first rod 280A and the second rod 280B may be provided on a front surface of the second section of the leg frame 73 between the leg frame 73 and the front lower body 61. The third rod 280C and the fourth rod 280D may be provided on a rear surface of the first leg frame 73 (e.g., a right leg frame) between the leg frame 73 and the rear lower body 62. Although the first and second rods 280A and 280B are at a diagonal from the second and third rods 280C and 280D, the first through fourth rods 280A through 280D may serve to control the same limb, which is the first arm 100A.

The fifth rod 280E and the sixth rod 280F may be provided on a front surface of the first leg frame 73 to be provided between the leg frame 73 and the front lower body 61. The seventh rod 280G and the eighth rod 280H may be provided on a rear surface of the second section of the leg frame 73 to be provided between the leg frame 73 and the rear lower body 62. Although the fifth and sixth rods 280E and 280F are at a diagonal from the seventh and eighth rods 280C and 280D, the fifth through eighth rods 280E through 280H may serve to control the second arm 100B.

The rod 280 may be connected to the arm 100 by a wire W (FIG. 6) and may descend to pull the wire W so the arm 100 operates. A movement of the arm 100 based on the wire W and the rod 280 will be described in detail with reference to FIGS. 6 and 7.

The robot 10 may further include a rod elastic member or spring 290 that provides elastic force to the rod 280. The rod spring 290 may be provided inside the lower body 60 and coupled to an upper section or end of the rod 280.

The rod spring 290 may be wound around an outer circumference of the rod 280. An elastic member or spring flange 281 (FIG. 6) may extend radially outward from an outer circumference of the rod 280, and the rod spring 290 may be supported by an upper side of the spring flange 281.

The rod spring 290 may be compressed between the spring flange 281 and the leg frame 73 when the rod 280 is lifted by an upward lifting force provided by the drive assembly 21 (FIG. 8) installed or located in the base 20 (FIG. 1). When the drive assembly 21 removes the upward lifting force applied to the rod 280, the rod spring 290 may be released and apply a downward elastic or restoring force to the rod 280 to lower the rod 280.

There may be a plurality rod springs 290 corresponding to the plurality of rods 280. For example, the plurality of rod springs 290 may include a first rod spring 290A that provides downward elastic force to the first rod 280A, a second rod spring 290B that provides downward elastic force to the second rod 280B, a third rod spring 290C that provides downward elastic force to the third rod 280C, a fourth rod spring 290D that provides downward elastic force to the fourth rod 280D, a fifth rod spring 290E that provides downward elastic force to the fifth rod 280E, a sixth rod spring 290F that provides downward elastic force to the sixth rod 280F, a seventh rod spring 290G that provides downward elastic force to the seventh rod 280G, and an eighth rod spring 290H that provides downward elastic force to the eighth rod 280H.

The robot 10 may further include the wire support 210. The wire support 210 may support the wire W (FIG. 6) connecting the rod 280 to the arm 100 to keep the wire W taut in certain configurations. The wire support 210 may be fixed to the body frame 71. However, embodiments disclosed herein are not limited to a fixed wire support 210, and the wire support 210 may alternatively be rotatably connected to the body frame 71 to serve as a bobbin.

The wire support 210 may have a substantially circular hollow cylinder shape. A hollow or hole 211 may penetrate a center of the wire support 210 in the front-rear direction. A protrusion or flange 72A (see FIG. 4) may be formed on a front surface of the body frame 71 to protrude forward and fit into the hole 211. The protrusion 72A may have a shape and size corresponding to a shape and size of hole 211. For example, the protrusion 72A may have a circular shape, and have a diameter that is less than or equal to a diameter of the hole 211. The wire support 210 may be coupled to the body frame 71 via an insertion of the protrusion 72A into the hole 211.

At least one groove 212 may be formed to be recessed radially inward from an outer circumference of the wire support 210. The groove 212 may be lengthily defined along a circumferential direction of the wire support 210. The wire W may be guided inside the groove 212 to be maintained on the wire support 210.

There may be a plurality of wires W described later, and a plurality of grooves 212 may be formed to be recessed radially inward from an outer circumference of the wire support 210. The plurality of grooves 212 may be spaced apart from each other in the front-rear direction. One wire W may be fitted into each of the grooves 212, and the grooves 212 may prevent the plurality of wires W from being entangled or twisted with each other. For example, the plurality of grooves 212 may include a first groove 212 into which a first wire W1 to be described later is fitted and a second groove 212 which is spaced apart from the first groove 212 and into which the second wire W2 is fitted.

An inner cover 220 may be provided inside the inner space of the upper body 50. A rear side of the wire support 210 may be covered by the inner frame 70, and a front side of the wire support 210 may be covered by an inner cover 220. The attachment frame 32 may also be provided at the front side of the wire support 210 and coupled to the inner cover 220, or alternatively the attachment frame 32 may be provided at the rear side of the wire support 210 and coupled to the inner frame 70. For convenience of description, the attachment frame 32 will be described as being in front of the wire support 220. In such a configuration, the inner cover 220 and/or the attachment frame 32 may be attached to the body frame 71 to create an inner space in which the wire support 210 is provided. The wire support 210 may be provided between the attachment frame 32 and the body frame 71 in the front and rear direction.

The inner cover 220 may have a cover through-hole 221 penetrating the inner cover 220 in the front-rear direction. An attachment frame through-hole 32A may penetrate the attachment frame 32 in the front-rear direction, and an inner frame through-hole 72B that may penetrate the inner frame 70 in the front-rear direction. The cover through-hole 221, the attachment frame through-hole 32A, the hole 211 of the wire support 210, and the inner frame through-hole 72B may be linearly arranged to align in the front-rear direction.

A coupling member (e.g., a screw or rod) may sequentially pass through the inner cover through-hole 221 of the inner cover 220, the attachment frame through-hole 32A of the attachment frame 32, the hole 211 of the wire support 210, and the inner frame through-hole 72B defined in the body frame 71 so as to be coupled to the rear upper body 52. Alternatively, the coupling member may sequentially pass through inner frame through-hole 72B, the hole 211, the attachment frame through-hole 32A, and the inner cover through-hole 221 to couple to the front upper body 51. A coupling groove or recess 52C to which the coupling member is coupled may be provided on an inner surface of the rear upper body 52 or the front upper body 51 so that the head 30, the inner frame 70, and the wire support 210 may be secured to the main body 40.

Figure 4:
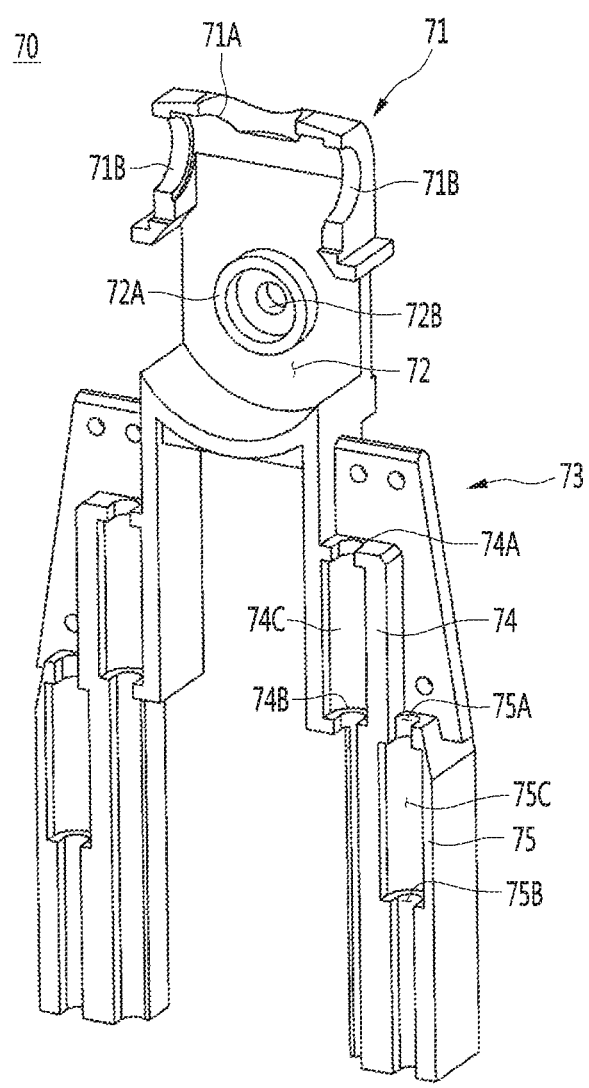
FIG. 4 is a perspective front view of an inner frame according to an embodiment.
Figure 5:
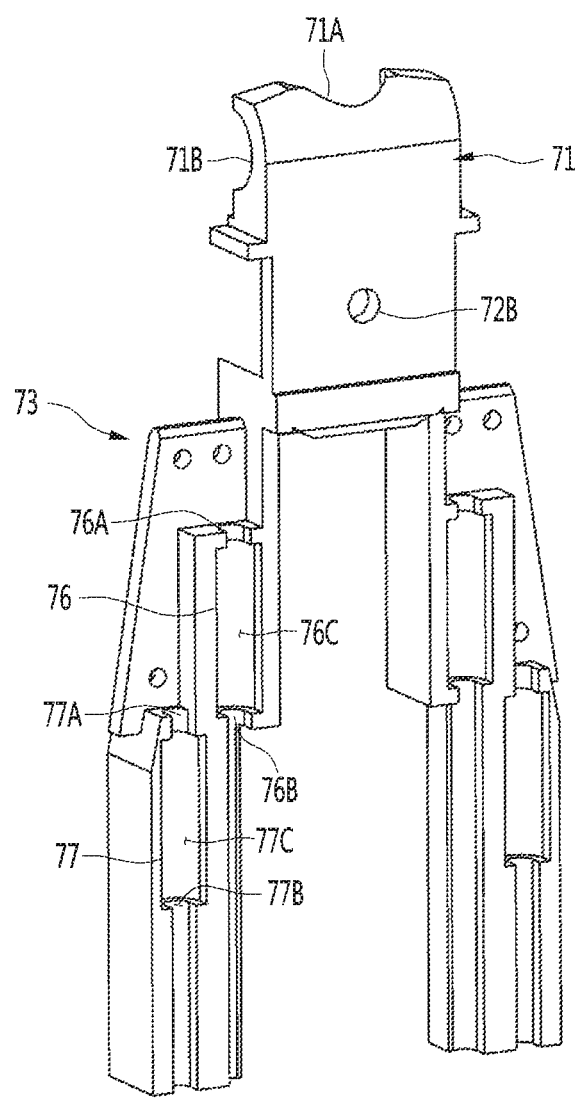
FIG. 5 is a perspective rear view of the inner frame when viewed according to an embodiment.

Referring to FIGS. 4 and 5, the inner frame 70 may include the body frame 71 and the leg frame 73, which may have first and second (i.e., right and left) sections. The body frame 71 and the leg frame 73 may be formed integrally, or alternatively be formed separately and later coupled (e.g., bonded, welded, or adhered).

The body frame 71 may have a box shape forming a front opening. A wire support space or recess 72 into which the wire support 210 (see FIG. 3) is received may be defined inside the body frame 71.

A bottom of the wire support space 72 may be defined by a curved bottom surface of the body frame 71. The bottom surface of the body frame 71 may have a predetermined curvature to correspond to an outer contour of a bottom of the wire support 210.

The protrusion 72A may be provided on an inner side of the rear surface of the body frame 71. The protrusion 72A may be fitted into the hole 211 (FIG. 3) of the wire support 210 and may have a circular hollow cylinder shape.

The inner frame through-hole 72B may be defined at a center of the protrusion 72A and/or in an inner space of a flange forming an outer portion of the protrusion 72A. The coupling member passing through the hole 211 of the wire support 210 may pass through the inner frame through-hole 72B.

An upper avoidance groove or arc 71A may be defined in a top surface of the body frame 71. The upper avoidance groove 71A may be defined at a position corresponding to the head connection holes 51B and 52B (FIG. 3) defined in the upper body 50. A portion of the attachment frame 32 passing through the head connection holes 51B and 52B may not interfere with the body frame 71 by the upper avoidance groove 71A. The attachment frame 32 may pass through or in front of the upper avoidance groove 71A to be between the inner frame 70 and the inner cover 220.

A side avoidance groove or arc 71B may be defined at first and second (i.e., right and left) sides of the body frame 71. The side avoidance groove 71B may be formed at a position corresponding to that of the arm connection hole 50A (FIG. 2) defined in the upper body 50. A portion of the arm 100 (i.e., the second shoulder joint 160) passing through the arm connection hole 50A may not interfere with the body frame 71 by the side avoidance groove 71B.

The side avoidance groove 71B may be formed to have a predetermined curvature or angle to correspond to an outer contour or outer circumference of the second shoulder joint 160. An inner circumferential surface of the side avoidance groove 71B may contact an outer circumferential surface of the second shoulder joint 160, and the side avoidance groove 71B and the arm connection hole 50A may guide a rotation or pivot movement of the second shoulder joint 160.

The leg frame 73 may extend downward from a lower end of the body frame 71 and at least partially protrude outward or forward.

The leg frame 73 may be formed with a number of rod guides 74, 75, 76, and 77 corresponding to the number of rods 280. For example, two front rod guides 74 and 75 may be provided on a front surface of each of the first and second sections of the leg frame 73, and two rear rod guides 76 and 77 may be provided on a rear surface of each of the first and second sections of the leg frame 73.

Each of the rod guides 74, 75, 76, and 77 may include upper guide grooves or openings 74A, 75A, 76A, and 77A and lower guide grooves or openings 74B, 75B, 76B, and 77B. Spring grooves or recesses 74C, 75C, 76C, and 77C may be formed between the upper guide grooves 74A, 75A, 76A, and 77A and the lower guide grooves 74B, 75B, 76B, and 77B, respectively, to communicate with the upper guide grooves 74A, 75A, 76A, 77A and the lower guide grooves 74B, 75B, 76B, and 77B.

The rod 280 may be fitted into upper guide grooves 74A, 75A, 76A, and 77A and the lower guide grooves 74B, 75B, 76B, and 77B, and a vertical movement of the rod 280 may be guided. The rod spring 290 and spring flange 281 may be provided in the spring grooves 74C, 75C, 76C, and 77C.

When the rod 280 ascends, the spring flange 281 may ascend to compress the rod spring 290 between the upper guide groove 74A, 75A, 76A, and 77A and the spring flange 281. The upper end of the rod 280 may continue to ascend past the upper guide groove 75A, 75A, 76A, and 77A until the rod spring 290 is compressed a maximum amount to have a minimum length between the spring flange 281 and the upper guide groove 74A, 75A, 76A, and 77A. When the rod 280 descends, the rod spring 290 may press the spring flange 281 down to further push the rod 280 down. The rod 280 may be pushed down until the spring flange 281 is hooked on the lower guide groove 74B, 75B, 76B, and 77B. A movement range of the rod 290 may be limited by the upper guide groove 74A, 75A, 76A, and 77A and the lower guide groove 74B, 75B, 76B, and 77B. The rod spring 290 may be easily compressed, released, and/or stretched.

Hereinafter with reference to FIGS. 3-7, the second (i.e., the left) section of the leg frame 73 will be described in relation to a movement of the first (i.e., the right) arm 100A. However, the first (i.e., the right) section of the leg frame 73 may have the same configuration.

Referring to FIGS. 3-5, a first rod guide 74 and a second rod guide 75 may be formed on a front surface of the second section of the leg frame 73. The first rod guide 74 may vertically guide the first rod 280A and the second rod guide 75 may vertically guide the second rod 280B.

A third rod guide 76 and a fourth rod guide 77 may be formed on the rear surface of the second section of the leg frame 74. The third rod guide 75 may vertically guide the third rod 280C and the fourth rod guide 77 may vertically guide the fourth rod 280D.

Figure 6:
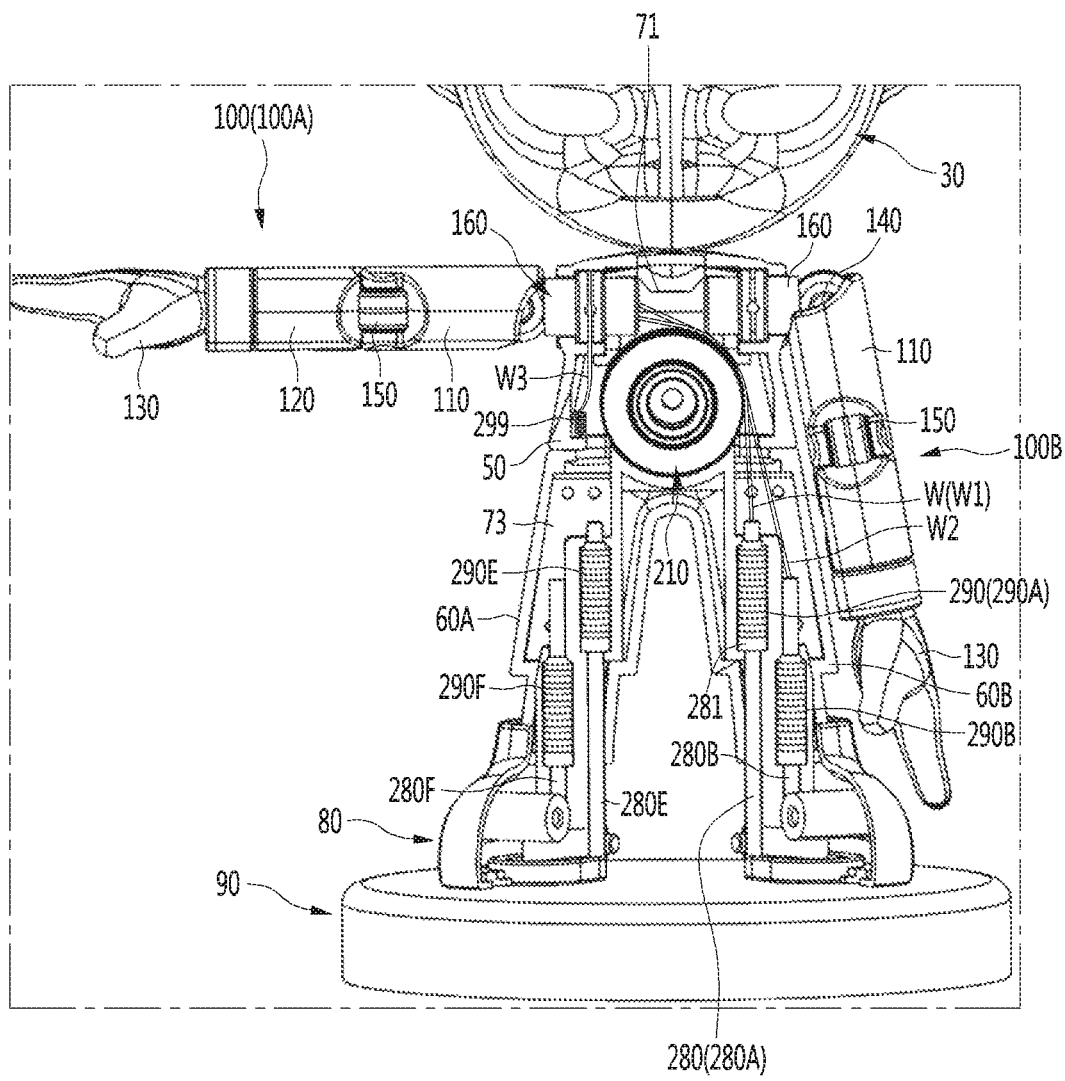
FIG. 6 is a front view illustrating an interior of the robot assembly according to an embodiment.

Referring to FIG. 6, the robot 10 may further include an auxiliary spring 299 provided inside the main body 40 and coupled to the inner frame 70. The auxiliary spring 299 may be connected to the wire W. The auxiliary spring 299 may pull the wire W downward by applying a downward elastic force to the wire W. The auxiliary spring 299 may not directly connect to the wire W, and the wire W may be connected to a bar that moves downward by the auxiliary spring 299.

There may be two auxiliary springs 299. A first auxiliary spring 299 provided at a first side may be connected to a wire W to drive the first arm 100A and a second auxiliary spring 299 provided at a second side other may be connected to a wire W to drive the second arm 1006. An operation of the auxiliary spring 299 will be described in detail later.

Figure 7:
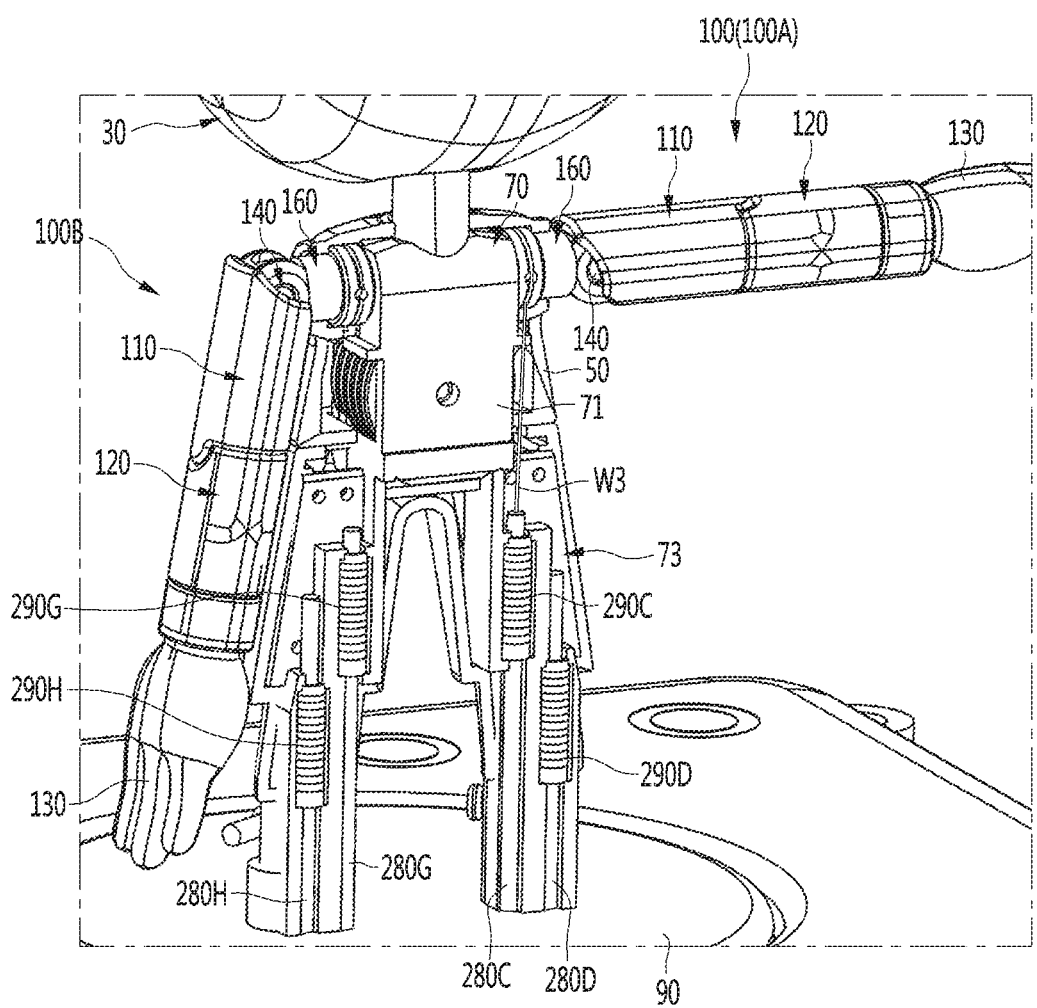
FIG. 7 is a rear view illustrating an interior of the robot assembly according to an embodiment.

Referring to FIGS. 6 and 7, the action robot 1 may include at least one wire W. The wire W may have a material having a high tensile strength to reduce or minimize breakage of the wire W and improve reliability. For example, the wire W may include a fishing line material or material similar to a fishing line. The wire W may include at least one of nylon, carbon fiber, or polyethylene. However, embodiments disclosed herein are not limited, and a material of the wire W may vary as necessary.

The arm 100 may be connected to the rod 280 by the wire W. The rod 280 may descend to pull the wire W so as to drive the arm 100.

The first shoulder joint 140 and the elbow joint 150 of the right arm 100A may be connected to rods 280 provided inside the left leg 60B (e.g., the first and second rods 280A and 280B) via first and second wires W1 and W2. The second shoulder joint 160 of the right arm 100A may be connected to a rod 280 provided inside the right leg 60A (e.g., the third or fourth rod 280C or 270D) by a third wire W3. With respect to the left arm 100B, the first shoulder joint 140 and the elbow joint 150 may be connected rods 280 provided inside of the right leg 60A (e.g., the fifth and sixth rods 280E and 280F) by wires, and the second shoulder joint 160 may be connected a rod provided inside the left leg 60B (e.g., the seventh or eighth rod 280G or 280H) by a wire.

FIGS. 6 and 7 show only the wires W1, W2, and W3 connected to the right arm 100A for convenience of description. In practice, however, it is obvious that additional wires connect to the left arm 100B. Since configurations of the right arm 100A and the left arm 100B may be symmetric with respect to each other, a person having ordinary skill in the art may also easily understand the left arm 100B by reading the description hereinafter of the right arm 100A.

The first wire W1 may be connected to the upper arm 110 or the first shoulder joint 140 of the arm 100 to pull the upper arm 110 or the first shoulder joint 140 in a direction in which the first shoulder joint 140 allows the upper arm 110 to move. The second wire W2 may be connected to the forearm 120 or the elbow joint 150 of the arm 100 to pull the forearm 120 in a direction in which the elbow joint 150 allows the forearm 120 to move.

The third wire W3 may be connected to an outer circumferential surface of the second shoulder joint 160. The third wire W3 may pull the second shoulder joint 160 to rotate clockwise or counterclockwise around the rotation axis of the second shoulder joint 160.

With respect to the right arm 100A, the first wire W1 may be connected to any rod 280 provided inside the left leg 60B. The second wire W2 may be connected to any other rod 280 provided inside the left leg 60B. The third wire W3 may be connected to one rod 280 provided inside the right leg 60A. For example, the first wire W1 may be connected to the first rod 280A, the second wire W2 may be connected to the second rod 280B, and the third wire W3 may be connected to the third rod 280C.

One end of the first wire W1 may be connected to the upper arm 110 and the other end of the first wire W1 may be connected to the first rod 280A. The first wire W1 may be supported by the wire support 210. One end of the second wire W2 may be connected to the forearm 120 and the other end of the second wire W2 may be connected to the second rod 280B. The second wire W2 may be supported by the wire support 210. One end of the third wire W3 may be connected to the auxiliary spring 299 and the other end of the third wire W3 may be connected to the third rod 280C. At least one hook may be provided between the ends of the third wire W3, and the hook may be connected to the second shoulder joint 160. The third wire W3 may be spaced apart from the wire support 210 and not be supported in the wire support 210.

The first, second, and third wires W1, W2, and W3 may be pulled by a movement of the first, second, and third rods 280A, 280B, and 280C. Detailed connection relations and functions of the arm 100 and the first, second, and third wires W1, W2, and W3 will be described later in detail.

Figure 8:
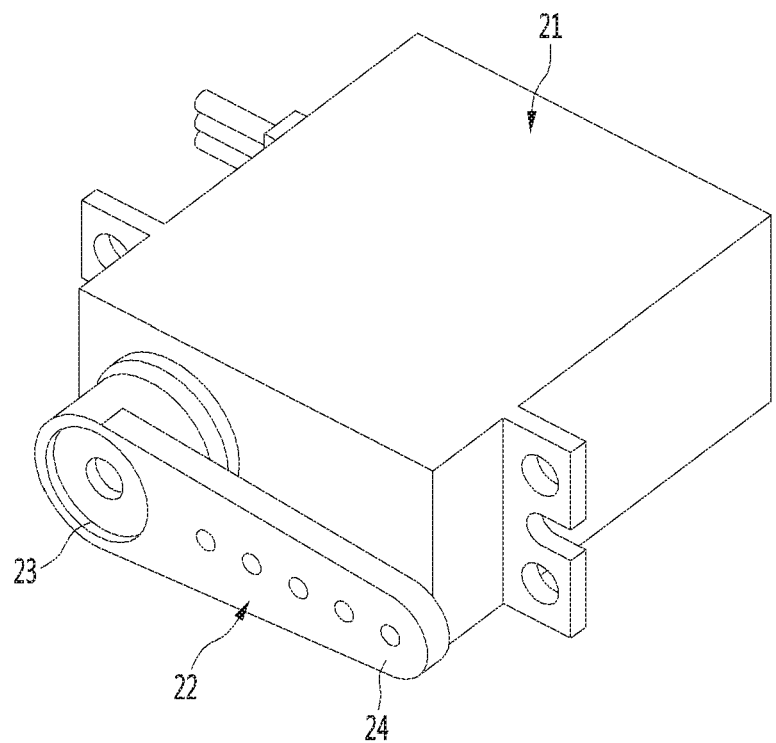
FIG. 8 is a perspective view of a drive assembly according to an embodiment.

Referring to FIG. 8, the drive assembly 21 may lift the rod 280 (FIG. 3) by applying an upward external force to the rod 280. The drive assembly 21 may be provided or built in the base 20 (FIG. 1) and may, for example, be implemented as a motor, linear actuator, pneumatic or hydraulic motor, or pinion and gear. There may be a plurality drive assemblies 21 to drive the plurality of rods 280. A number of drive assemblies 21 may equal the number of the rods 280.

For example, the plurality of drive assemblies 21 may include a first drive assembly to lift the first rod 280A to ascend, a second drive assembly to lift second rod 280B, a third drive assembly to lift third rod 280C, a fourth drive assembly to lift the fourth rod 280D, a fifth drive assembly to lift the fifth rod 280E, a sixth drive assembly to lift the sixth rod 280F, a seventh drive assembly to lift the seventh rod 280G, and an eighth drive assembly to lift the eighth rod 280H. Thus, each of the rods 280 may be independently controlled and lifted.

For convenience of description, an implementation of the drive assembly 21 including a motor will be described as an example. However, the configuration of the drive assembly 21 is not limited thereto. For example, the drive assembly 21 may alternatively include an actuator.

A pusher or lever 22 may be connected to the drive assembly 21. The pusher 22 may have a lever or tab shape. The pusher 22 may include a connection portion or hinge 23 connected to a rotation axis of the drive assembly 21 and a rod pressing portion or surface 24 positioned to push a lower end of the rod 280 upward. The rod pressing surface 24 may extend from the connection portion 23, which may serve as a fulcrum or pivot point of the presser 22.

When the pusher 22 rotates in a first direction (e.g., counterclockwise), the rod pressing surface 24 may ascend to push the lower end of the rod 280 upward. When the pusher 22 rotates in an opposite direction, the external force applied to the rod 280 may be removed.

In the case of the first and second wires W1 and W2 connected to the upper arm 110 and forearm 120, when the external force is applied to lift the first or second rod 280A or 280B upward, the first or second rod spring 290A or 290B may be compressed. When the external force applied to the first or second rod 280A or 280B is removed, the first or second rod spring 290A or 290B may be released to apply a downward restoring or elastic force on the first or second rod 280, and the first or second rod 280 may be pulled downward to pull the first or second wire W1 or W2. When the first or second rod 280A or 280B is pushed upward, the first or second wire W1 or W2 may be pushed upward, and a tension of the first or second wire W1 and W2 may be reduced.

In the case of the third wire W3 extending between the third rod 280C and the auxiliary spring 299, the third wire W3 may remain taut throughout a movement of the third rod 280C, and the auxiliary spring 299 may instead alternate between a neutral state and an expanded state, as opposed to a neutral state and a compressed state, as may be the case with the first and second springs 290A and 290B). When the third rod 280C is lifted, the third spring 290C may be compressed, and the auxiliary spring 299 may approach a neutral state from an expanded state. The hook on the third wire W3 may rotate the second shoulder joint 160. When the external force is removed from the third rod 280C, the third spring 290C may be released to push the third rod 280C downward and pull the third wire W3 so as to tug on the auxiliary spring 299. The spring constant of the third spring 290C may be greater than the spring constant of the auxiliary spring 299 so that the restoring force of the third spring 290C pulls the third wire W3, which pulls the auxiliary spring 299 to an expanded state.

Figure 9:
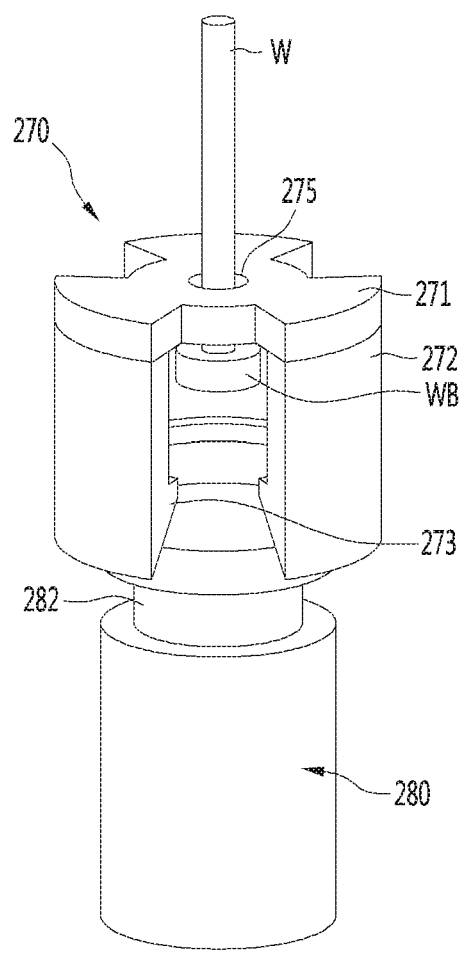
FIG. 9 is a perspective view of a wire connector and rod according to an embodiment.
Figure 10:
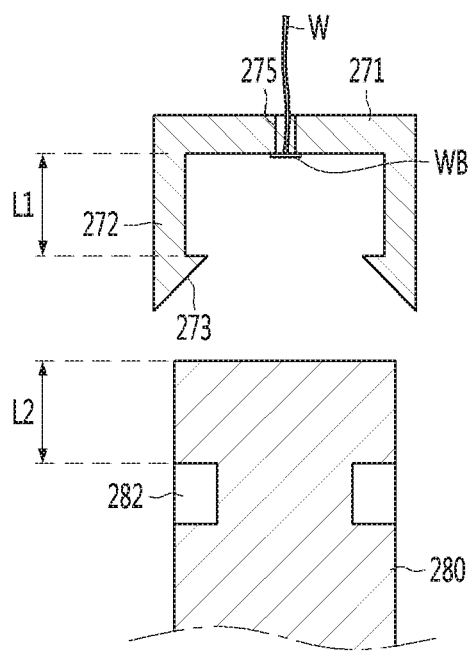
FIG. 10 is a cross-sectional view of the wire connector to show how the wire connector is coupled to the rod according to an embodiment.

Referring to FIGS. 9 and 10, the action robot 1 may further include a wire connector 270. The wire connector 270 may connect the wire W to the rod 280. The wire connector 270 may include a first section or top frame 271 provided above the rod 280 and a second section or side frame 272 extending downward from the top frame 271. The top and side frames 271 and 272 may be formed integrally, or alternatively may be separately formed and later combined (e.g., welded or bonded).

The top frame 271 may have a substantially horizontal plate shape. A bottom surface of the top frame 271 may face an upper end of the rod 280. A through-hole 275 may be formed in the top frame 271 to penetrate the top frame 271 in a vertical direction. The wire W may pass through the through-hole 275.

A hook or cap WB may be provided on an end of the wire W. The hook WB may be formed by heating and dissolving an end of the wire W so as to be hardened and bent or curved. As another example, the hook WB may be a knot formed in the wire W.

The hook WB may be provided below the top frame 271 between the top frame 271 and the upper end of the rod 280 to prevent the wire W from being disconnected from the wire connector 270. The hook WB may have a thickness greater than that of the wire W and the through hole 275 so that the hook WB may not pass through the through-hole 275 and remain connected, via the wire connector 270, the rod 280.

The side frame 272 may extend downward from a bottom of an outer edge of the top frame 271 to surround the wire W and/or a top of the rod 280. An inner surface of the side frame 272 may face an outer circumference of the rod 280. There may be a plurality of side frames 272 spaced apart from each other in a circumferential direction of the rod.

A hook 273 may be formed on a lower inner side of the side frame 272. The hook 273 may protrude from the inner surface of the side frame 272 toward the rod 280. A hook groove 282 may be recessed inward in the outer circumference of an upper side of the rod 280. The hook groove 282 may extend in the circumferential direction of the rod 280. The hook 273 may be hooked into the hook groove 282 to secure the wire connector 270 to the rod 280.

The side frame 272 may be pliable or flexible so as to be elastically deformed within a predetermined range. A bottom edge of the hook 273 may be inclined. When the wire connector 270 is inserted onto the rod 280, the hook 273 may contact the outer circumference of the rod 280 and spread radially outward so that the plurality of side frames 272 may be spaced a bit further apart. At such a position, the side frames 272 may act a bit like an expanded spring. As the wire connector 270 continues to descend, the hook 273 may be hooked in the hook groove 282 by a restoring elastic force of the side frame 272. Thus, the wire connector 270 may be firmly secured to the rod 280.

A vertical distance L1 from a bottom surface of the top frame 271 to an upper end or surface of the hook 273 may be equal to or greater than a vertical distance L2 from an upper end of the rod 280 to a top of the hook groove 282. For example, the vertical distance L1 may be equal to the sum of the vertical distance L2 and a vertical thickness or height of the hook WB.

When the hook 273 is hooked in the hook groove 282, the hook WB provided on the end of the wire W may be fixed between the top frame 271 and an upper end of the rod 280 and not easily moved or slid. When the rod 280 descends, the wire W may be immediately tensioned, and reactivity of the arm 100 connected to the wire W may be improved.

Figure 11:
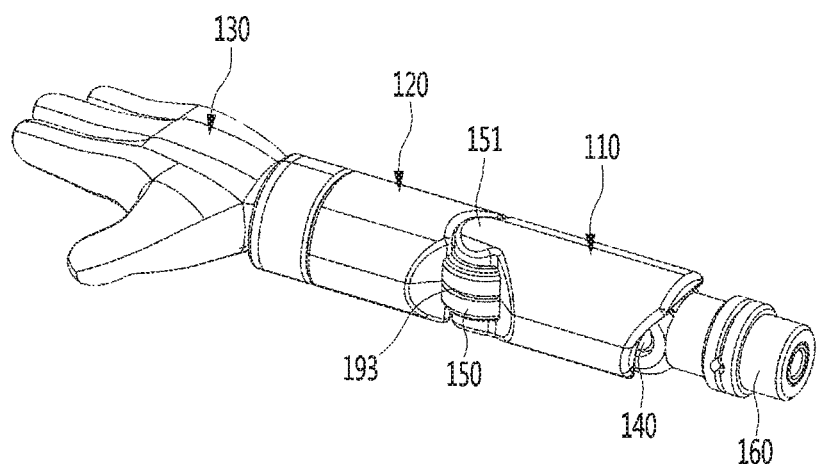
FIG. 11 is a perspective view of an arm assembly according to an embodiment.
Figure 12:
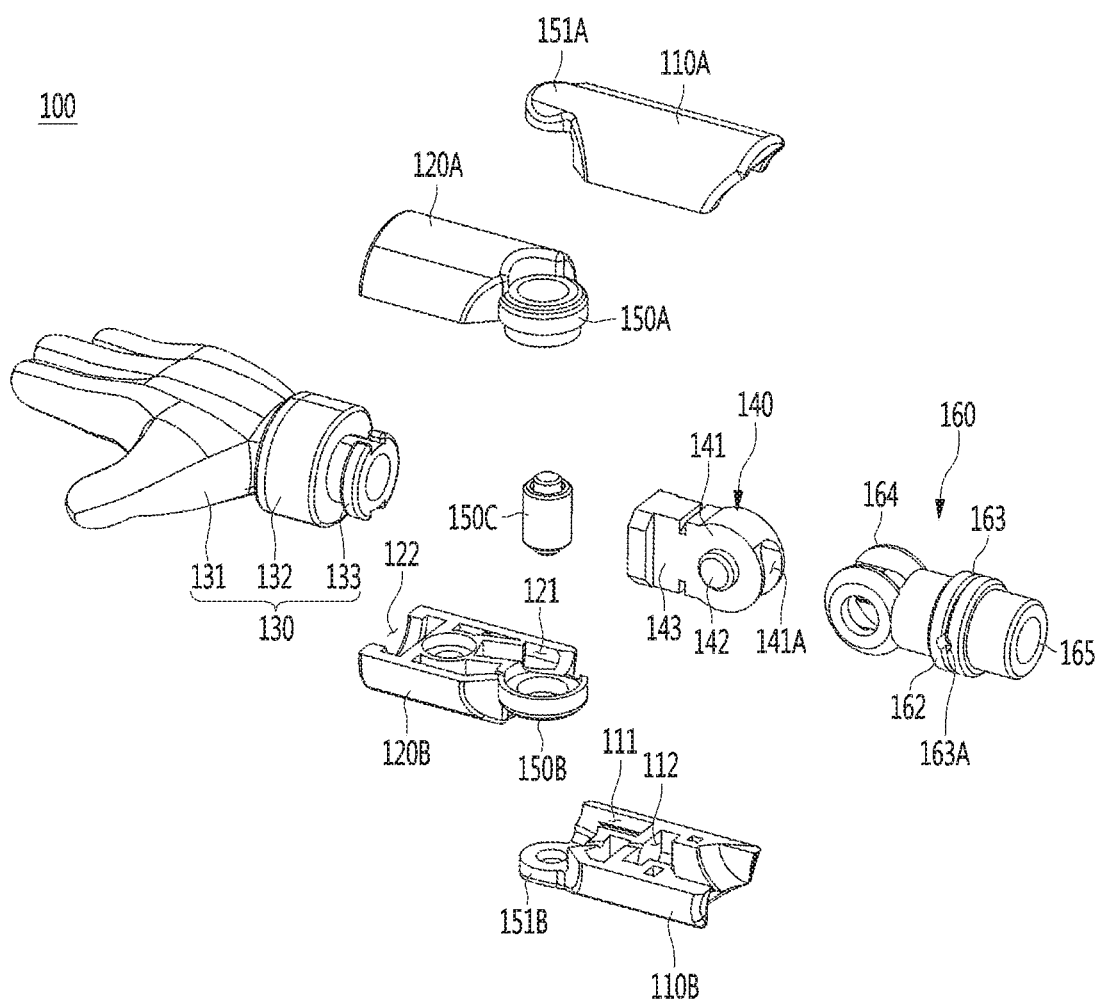
FIG. 12 is an exploded perspective view of the arm assembly according to an embodiment.

Referring to FIGS. 11 and 12, the arm 100 may include the upper arm 110, the forearm 120, the hand 130, the first shoulder joint 140, the elbow joint 150, and the second shoulder joint 160. The upper arm 110 may have an approximate bar or cylindrical shape. The upper arm 110 may include a first or upper shell or frame 110A and a second or lower shell 110B coupled to the upper shell or frame 110A. The upper and lower shells 110A and 110B may be detachably coupled (i.e., pressed-fit or adhered). Each of the upper and lower shells 110A and 110B may extend in a longitudinal direction of the upper arm 110.

An elbow joint connection section or bracket 151 may be provided at an end of the upper arm 110 to rotatably connect to the elbow joint 150. The elbow joint connection bracket 151 may protrude from the upper arm 110 toward the forearm 120.

The elbow joint connection bracket 151 may be defined by a first or upper bracket 151A provided on the upper shell 110A, and a second or lower bracket 151B provided on the lower shell 110B. The first and second elbow joint connection brackets 151A and 151B may have a small thickness so as to be spaced apart from each other when the upper and lower shells 110A and 110B of the upper arm 110 are coupled. The elbow joint 150 may include a shaft or pin 150C to allow the forearm 120 to rotate or pivot between the first and second elbow joint connection brackets 151A and 151B.

The elbow joint 150 may allow the forearm 120 to rotate with respect to the upper arm 110. The forearm 120 may rotate by the elbow joint 150 to resemble bending and unbending of a human's elbow.

The elbow joint 150 may include first and second (i.e., upper and lower) rings 150A and 150B formed in the upper and lower shells 120A and 120B of the forearm 120, respectively. The shaft 150C may be rotatably supported between the upper and lower rings 150A and 150B, and ends of the shaft 150C may be fixed to the upper and lower elbow connection brackets 151A and 151B so that the upper and lower rings 150A and 150B rotate around the shaft 150C. A longitudinal direction of the shaft 150C at a center may define a rotation axis of the elbow joint 150.

The upper ring 150A may be provided on an end of the upper forearm 120A at a position so as to align (in the vertical direction in FIG. 12) with the first elbow joint connection bracket 151A. The second ring 150B may be provided on an end of the lower forearm 120B at a position so as to vertically align with the second elbow joint connection bracket 151B.

The shaft 150C may be connected to the elbow joint connection bracket 151 via the rings 150A and 150B. The shaft 150C may be cylindrical and have one end connected to the first elbow joint connection 151A and the other end connected to the second elbow joint connection 151B. The forearm 120, via the rings 150A and 150B, may rotate about the shaft 150C and with respect to the upper arm 110A, which includes the upper and lower elbow joint connection brackets 151A and 151B.

A first elbow spring groove or recess 111 may be formed in an upper or inner surface of the lower shell 110B. A portion of the elbow spring 180 (FIG. 13) may be provided inside the first elbow spring recess 111. The first elbow spring recess 111 may include a space that is opened toward the forearm 120.

A shoulder joint mounting recess or cavity 112 may be formed in the upper or inner surface of the lower shell 110B to be adjacent to the first elbow spring recess 111. The first shoulder joint 140 may be mounted in the shoulder joint mounting recess 112. The shoulder joint mounting recess 112 may include a space that is opened toward the upper body 50 (FIG. 2).

The forearm 120 may have an approximate bar or cylindrical shape. An outer diameter of the forearm 120 may be equal or similar to that of the upper arm 110. The forearm 120 may include a first or upper shell 120A and a second or lower shell 120B that are detachably coupled (e.g., pressed-fit or adhered) to each other. Each of the upper and lower shells 120A and 120B may extend in a longitudinal direction of the forearm 120.

A second elbow spring groove or recess 121 may be formed in an upper surface of the lower shell 120B of the forearm 120. A portion of the elbow spring 180 may be provided in the second elbow spring recess 121. The second elbow spring recess 121 may include a space opened toward the upper arm 110 so that the first and second elbow spring recesses 111 and 121 communicate with each other. The entire elbow spring 180 may be provided in the first and second elbow spring recesses 111 and 121 at a position that does not interfere with the elbow joint 150.

Also, a hand mounting recess or groove 122 may be formed at an end of the lower shell 120B of the forearm 120. The hand 130 (or, alternatively, an optional wrist joint) may be mounted in the hand mounting recess 122. The hand mounting recess 122 may include a space opened toward the hand 130. The hand 130 may be coupled, via the hand mounting recess 122, to an end of the forearm 120 that is opposite to an end of the forearm 120 coupled to the upper arm 110.

The hand 130 may include a hand 131, a wrist 132, and a forearm connection section or shaft 133. The hand 131 may extend from a side surface of the wrist 132 and have a hand shape (i.e., a shape resembling a palm and fingers). The wrist 132 may have a cylindrical shape. An outer diameter of the wrist 132 may be equal or similar to that of the forearm 120. The forearm connection shaft 133 may be extend from a side surface of the wrist 132 that is opposite to the side surface of the wrist 132 connected to the hand 131.

The forearm connection shaft 133 may have an outer diameter smaller than that of the wrist 132 and may extend toward the forearm 120. The forearm connection shaft 133 may be configured to mount to the hand mounting recess 122 to be provided inside the forearm 120 (i.e., covered by the upper and lower shells 120A and 120B of the forearm 120). The forearm connection shaft 133 may not be visible from an outside of the forearm 120. A shape of an outer contour of the forearm connection shaft 133 may have a shape corresponding to an inner contour of the hand mount 122. For example, the forearm connection shaft 133 may include smaller grooves, ribs, or flanges that are configured to align with ribs, flanges, or grooves formed in the handle mounting recess 122.

The first shoulder joint 140 may allow the upper arm 110 to rotate with respect to the second shoulder joint 160 and may correspond roughly to a movement of a human arm at the armpit. One side of the first shoulder joint 150 may be rotatably connected to the second shoulder joint 160, and the other side may be fixed to the upper arm 110.

The first shoulder joint 140 may include a second shoulder joint connection section or base 141 and an upper arm connection section or shaft 143. The second shoulder joint connection section 141 may be configured to connect to the second shoulder joint 160 while the upper arm connection section 143 may be configured to connect to the upper arm 110.

The upper arm connection section 143 may be integrated with the second shoulder joint connection section 141. Alternatively, the upper arm connection section 143 and the second shoulder joint connection section 141 may be formed separately and later combined (e.g., pressed-fit, bonded, welded, or adhered).

The upper arm connection section 143 may be mounted in the shoulder joint mounting recess 112 formed in the lower shell 110b of the upper arm 110 so as not to be visible from an outside. The upper arm connection section 143 may be configured to be detachably coupled to the shoulder joint mounting recess 112 (e.g., pressed-fit or adhered) so as to make reparations of the upper arm 110 convenient. Alternatively, the upper arm connection section 143 may be permanently attached (e.g., formed integrally or bonded or welded) to the upper arm 110.

A protrusion or pin 142 having a cylindrical shape may be formed at sides (e.g., front and rear sides in FIG. 12) of the second shoulder joint connection section 141. The protrusion 142 may have a cylindrical shaft shape. The second shoulder joint 160 may include a first shoulder joint connection ring or knuckle 164. The first shoulder joint connection knuckle 164 may include rings. The protrusion 142 may be inserted into the first shoulder joint connection knuckle 164 so as to be rotatably coupled to the second shoulder joint 160

A portion of the second shoulder joint connection section 141 from which the protrusion 142 extends may be relatively flat or planar. An edge formed between the planar sections may be rounded to form a circumferential surface. The planar sections may be front and rear planes, and the protrusion 142 may protrude forward from the front plane and rearward from the rear plane. A longitudinal direction of the protrusion 142 at a center of the protrusion 142 may define a rotation axis of the first shoulder joint 140.

A front side of the protrusion 142 may be inserted into a front ring of the first shoulder joint connection knuckle 164, and a rear side of the protrusion 142 may be inserted into a rear ring of the first shoulder joint connection knuckle 164. A width of the second shoulder joint connection section 141 may be configured to fit between the rings of the first shoulder joint connection knuckle 164, and a curvature of the circumferential surface of the second shoulder joint connection section 141 may allow rotation of the first shoulder joint 140 with respect to the first shoulder joint connection knuckle 164.

A spring avoidance groove or recess 140A may be formed in a side and bottom of the circumferential surface of the second shoulder joint connection section 141. The spring avoidance groove 140A may prevent the shoulder spring 170 (FIG. 16) described later and the second shoulder joint connection section 141 from interfering with each other during a movement of the first shoulder joint 141.

A first shoulder spring groove or recess 146 (FIG. 16) may be formed through the upper arm connection section 143. A portion of the shoulder spring 170 may be provided in the first shoulder spring groove or recess 146. The first shoulder spring recess 146 may include a space opened toward the upper arm 110 and communicate with the spring avoidance groove 141A.

The first shoulder spring recess 146 and the spring avoidance groove 141A may communicate with a second shoulder spring recess 166 (FIG. 16) formed through the shoulder joint 160 and described later. The entire shoulder spring 170 may be provided in the first shoulder spring recess 146, the spring avoidance groove 141A, and the second shoulder spring recess 166.

The second shoulder joint 160 may allow the first shoulder joint 140 and the upper arm 110 to rotate with respect to the main body 40. The entire arm 100 may rotate by the second shoulder joint 160 to extend the arm forward or backward or to twist, depending on a position of the first shoulder joint 140 with respect to the second shoulder joint 160.

The second shoulder joint 160 may have a cylindrical shape extending in the left-right direction. A flange 162 may be formed to extend radially outward from an outer circumference of the second shoulder joint 160. A wire groove 163 may be formed around the flange 162 in the circumferential direction. The third wire W3 may be hooked in the wire groove 163.

The wire groove 163 may include a third wire hook groove or section 163A in which a hook, cap, or knot of the third wire W3 may be provided. A width of the hook groove 163A may be larger than that of the wire groove 163 but smaller than that of the hook of the third wire W3 so that the third wire W3 may be fixed to the second shoulder joint 160 via the hook wire groove 163A.

The second shoulder spring recess 166 (see FIG. 16) may be formed in the second shoulder joint 160. The second shoulder spring recess 166 may include a space opened toward the first shoulder joint 140. The second shoulder spring recess 166 may communicate with the spring avoidance groove 141A.

A wire inlet 165 may be formed through the second shoulder joint 160 to communicate with the second shoulder spring recess 166. The wire inlet 165 may communicate with an inside of the upper body 50. The first wire W1 and the second wire W2 may pass through the wire inlet 164 to connect to the upper arm 110 and the forearm 120, respectively.

The first shoulder joint connection knuckle 164 may be provided on an end of the second shoulder joint 160 opposite to an end of the second shoulder joint 160 having the wire inlet 165. The rings of the first shoulder joint 164 may be spaced apart from each other so as to provide a space in which the second shoulder joint connection 141 is provided and that communicates with the second shoulder spring recess 166. The protrusion 142 may be fitted into the pair of rings so that the first shoulder joint 140 may be rotatably connected to the second shoulder joint 160.

The end of the second shoulder joint 160 having the wire inlet 165 may have a smaller outer diameter than that of the flange 163 and be configured to fit into the arm connection hole 50A (FIG. 2) of the upper body 50. A longitudinal direction of the wire inlet 165 and/or the second shoulder spring recess 166 at a center of the wire inlet 165 may define a rotation axis of the second shoulder joint 160.

The rotation axis of the second shoulder joint 160 may be perpendicular to the rotation axis of the first shoulder joint 140. The rotation axes of the first and second shoulder joints 140 and 160 may be, in the configuration of FIG. 12, perpendicular to the rotation axis of the elbow joint 150. However, when the arm 100 is provided down at a side of the action robot 1, as exemplified by the left arm 1006 in FIG. 3, the rotation axis of the elbow joint 150 may be parallel to the rotation axis of the second shoulder joint 160.

Referring quickly to FIGS. 16 and 17, when the arm 100 is extended outward (as the right arm 100A is in FIG. 2), a rotation axis X3 of the second shoulder joint 160 may be perpendicular to each of a rotation axis X1 of the first shoulder joint 140 and a rotation axis X2 of the elbow joint 150. The rotation axis X3 of the second shoulder joint 160 may extend in the left-right direction no matter an orientation of the arm 100. The rotation axis X1 of the first shoulder joint 140 may extend in the front-rear direction in FIG. 16 and in the left and right arms 100A of FIG. 2, but may change based on a rotation of the second shoulder joint 160. The rotation axis X2 of the elbow joint 150 may be vertical in FIG. 16 and in the right arm 100A of FIG. 2, and in the left-right direction of the left arm 100B of FIG. 2, but may be changed based on rotations of the first and second shoulder joints 150 and 160. The rotation axes X1, X2, and X3 of the joints 140, 150, and 160 may be virtual axes. In the orientation of FIG. 17, the rotation axis X2 of the elbow joint extends in the front-rear direction and the rotation axis of the first shoulder joint 140 extends in the vertical direction.

Figure 14:
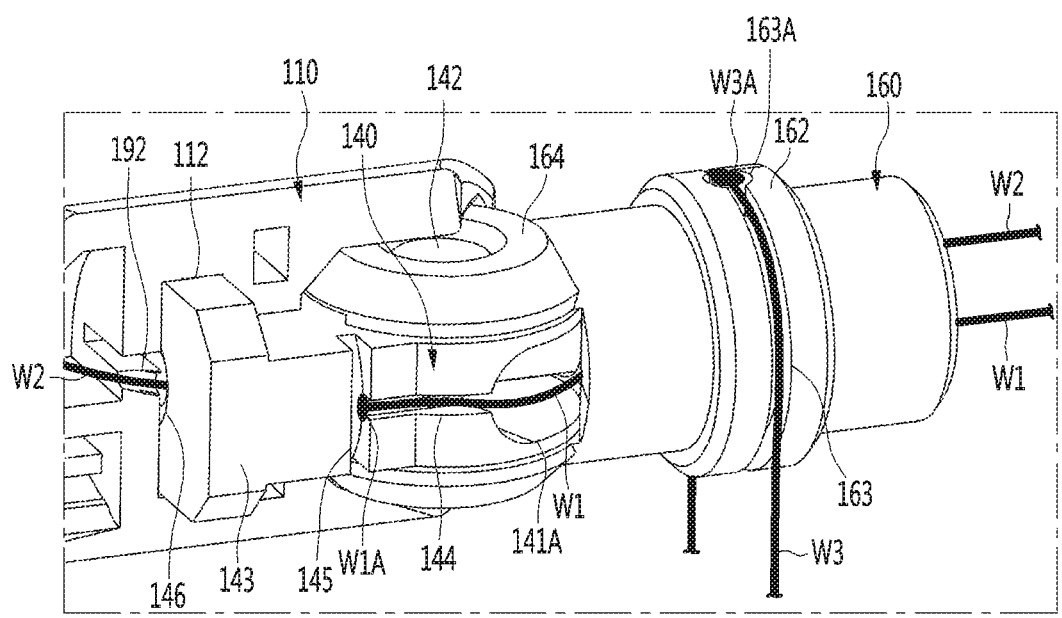
FIG. 14 is an enlarged view illustrating a shoulder joint and a periphery of a first wire hook groove of the arm assembly of FIG. 13.

Referring to FIGS. 14, 16, and 17, the first wire W1 and the second wire W2 may be inserted into the arm 100 through the wire inlet 165 and the arm connection hole 50A of the upper body 50 (FIG. 2).

The wire inlet 165 may be formed as a circular or cylindrical hollow hole at one end of the second shoulder joint 160 and extending in the longitudinal direction of the second shoulder joint 160. The second shoulder spring recess 166 may communicate with the wire inlet 165 and pass from the wire inlet 165 to the other end of the second shoulder joint 160. The second shoulder spring recess 166 may be a circular or cylindrical hollow hole that extends in the longitudinal direction of the second shoulder joint 160.

As shown in FIG. 16, an inner circumference of the second shoulder spring recess 166 and an inner circumference of the wire inlet 166 may be stepped with respect to each other (i.e., not aligned) so that a central axis of the second shoulder spring recess 166 may not coincide with a central axis of the wire inlet 165. As an example, the central axis of the wire inlet 165 may coincide with the rotation axis X3 of the second shoulder joint 160, and the central axis of the second shoulder spring recess 166 may provided above the second shoulder joint 160. Alternatively, the central axes of the second shoulder spring recess 166 and the wire inlet 165 may align and coincide.

A first guide groove 167 may be defined in an inner surface of the second shoulder joint 160 adjacent to the second shoulder spring recess 166. The first guide groove 167 may guide as passage of the first wire W1. The first guide groove 167 may be formed by recessing a lower end of an inner circumference of the second shoulder spring recess 166 downward.

The first guide groove 167 may extend from the wire inlet 165 to the other end of the second shoulder joint 160 to communicate with the wire inlet 165 and the spring avoidance groove 141A. The first guide groove 167 may be covered by the shoulder spring 170, so a portion of the first wire W1 may be provided between the shoulder spring 170 and the first guide groove 167.

A lower end of the first guide groove 167 may be rounded or curved so as to gradually decrease in height in a direction approaching the spring avoidance groove 141A. The first wire W1 may be smoothly guided to a first wire hook groove 145 defined in a lower portion of the upper arm connection section 143.

The first shoulder spring recess 146 and the spring avoidance groove 141A may be formed through the first shoulder joint 140. The spring avoidance groove 141A may be provided between the first shoulder spring recess 146 and the second shoulder spring recess 166.

A lower end of the spring avoidance groove 141A may be spaced a predetermined distance apart from a lower end of the second shoulder spring recess 166 in the orientation shown in FIG. 16. When the first shoulder joint 140 rotates to bring the arm 100 inward and adjacent to a side of the action robot 1, the lower end of the spring avoidance groove 141A may approach or contact the lower end of the second shoulder spring recess 166, and the shoulder spring 170 may bend or fold.

An inner top surface of the spring avoidance groove 141A may be connected to and/or aligned with an inner top surface of the first shoulder spring recess 146 in the orientation of FIG. 16. An inner bottom surface of the spring avoidance groove 141A may extend from an inner bottom surface of the first shoulder spring recess 146 to the lower end of the spring avoidance groove 141A. The inner bottom surface of the spring avoidance groove 141A may be curved or inclined so as to have a a height that decreases in a direction away from the first shoulder spring recess 146. When the first shoulder joint 140 rotates, the shoulder spring 170 may not interfere with the first shoulder joint 140 despite a bending motion.

The shoulder spring 170 may provide expand or contract upon a bending movement of the first shoulder joint 140, and may provide a restoring elastic force in a direction in which the arm 100 is extended outward to a side and first shoulder joint 140 is in an unfolded state (i.e., as shown in the configurations of FIG. 16 or by the right arm 100A in FIG. 2). The shoulder spring 170 may be referred to as a joint spring or an elastic member. The shoulder spring 170 may have a substantially circular hollow cylinder shape. For example, the shoulder spring 170 may have an integrated body made of an elastic material or may be a coil spring. However, embodiments disclosed are not limited to a coil spring configuration. For example, the shoulder spring 170 may be an accordion spring or be made of a flexible or foam material.

The shoulder spring 170 extend through the first shoulder spring recess 146, the spring avoidance groove 141A, and the second shoulder spring recess 166. One end of the shoulder spring 170 may be fitted in the first shoulder spring recess 146 to be fixed to the first shoulder joint 140 and/or the upper arm 110, and the other end of the shoulder spring 170 may be fitted in the second shoulder spring recess 166 to be fixed to the second shoulder joint 160. An intermediate portion of the shoulder spring 170 may be provided in the spring avoidance groove 141A.

When the first shoulder joint 140 rotates so as to "fold" the first shoulder joint 140 (i.e., close the armpit and bring the arm 100 inward toward the main body 40), a tension of the first wire W1 may be increased to pull the upper arm 110, and the shoulder spring 170 may be elastically deformed and folded. The end of the shoulder spring 170 provided the second shoulder spring recess 166 may remain fixed, while the end of the shoulder spring 170 provided in the second shoulder spring recess 146 may rotate or pivot together with the upper arm 110 around the first shoulder joint 140. When the drive assembly 21 removes the upward external force on the rod 280 such that the tension of the first wire W1 is loosened, the restoring elastic force of the shoulder spring 170 may rotate the first shoulder joint 140 back to "unfold" (i.e., open the armpit and bring the arm 100 outward away from the main body 40).

When the first shoulder joint 140 rotates so as to be completely unfolded, the shoulder spring 170 may contact an inner top surface of the spring avoidance groove 141A. When the first shoulder joint 140 rotates so as to fold completely, the shoulder spring 170 may contact an inner bottom surface of the spring avoidance groove 141A.

Figure 13:
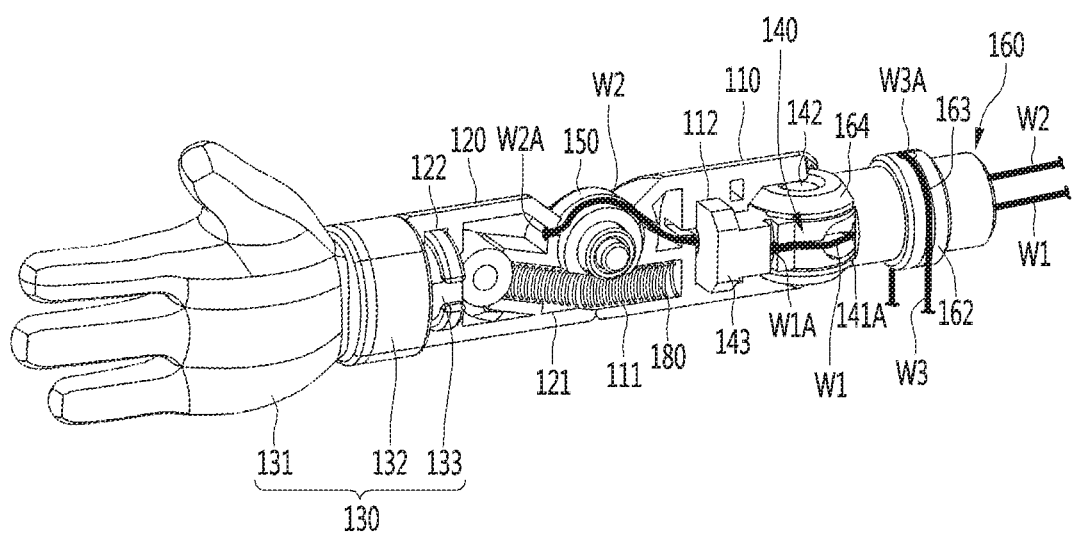
FIG. 13 is a view illustrating an interior of the arm assembly according to an embodiment.

A second guide groove 144 and a first wire hook groove 145 may be defined in at least one of the upper arm 110 and the first shoulder joint 140. FIGS. 13 and 14 exemplify a case in which the second guide groove 144 and the first wire hook groove 145 are formed in a bottom of the first shoulder joint 140, but embodiments disclosed herein are not limited to such a configuration.

The second guide groove 144 may guide the first wire W1 together with the first guide groove 167. The first wire W1 may be hooked in the first wire hook groove 145. Therefore, the tension of the first wire W1 may pull the upper arm 110 via the first wire hook groove 145. The second guide groove 144 may be defined in an outer surface, more specifically, a bottom surface of the first shoulder joint 140. The second guide groove 144 may communicate with the spring avoidance groove 141A.

Referring to FIGS. 13, 14, and 16, the second guide groove 144 may communicate with the spring avoidance groove 141A and the first wire hook groove 145. The first wire hook groove 145 may be formed in an outer lower surface of the first shoulder joint 140. The first wire hook groove 145 may communicate with the second guide groove 144 and extend in a direction perpendicular to the second guide groove 144. The second guide groove 144 and the first wire hook groove 145 may be provided inside the upper arm 110 so as to not be visible from an outside of the action robot 1, improving an overall appearance.

Referring to FIGS. 13 and 16, the first wire W1 may be inserted into the second shoulder joint 160 through the wire inlet 165 and guided by the first guide groove 167 and the second guide groove 144. A hook or cap W1A may be provided on an end of the first wire W1. The hook W1A may be formed by heating, dissolving, or hardening an end of the first wire W1 and/or bending the end of the first wire W1, but embodiments disclosed herein are not limited hereto. For another example, the hook W1A may be a knot formed in the first wire W1. The hook W1A may have a thickness greater than that of the rest of the first wire W1.

The hook W1A may be provided in the first wire hook groove 145 and have a size so as not to not pass through the second guide groove 144. When the first wire W1 is pulled, the hook W1A may be hooked in the first wire hook groove 145, and the first shoulder joint 140 and the upper arm 110 may be folded with respect to the second shoulder joint 160.

Figure 15:
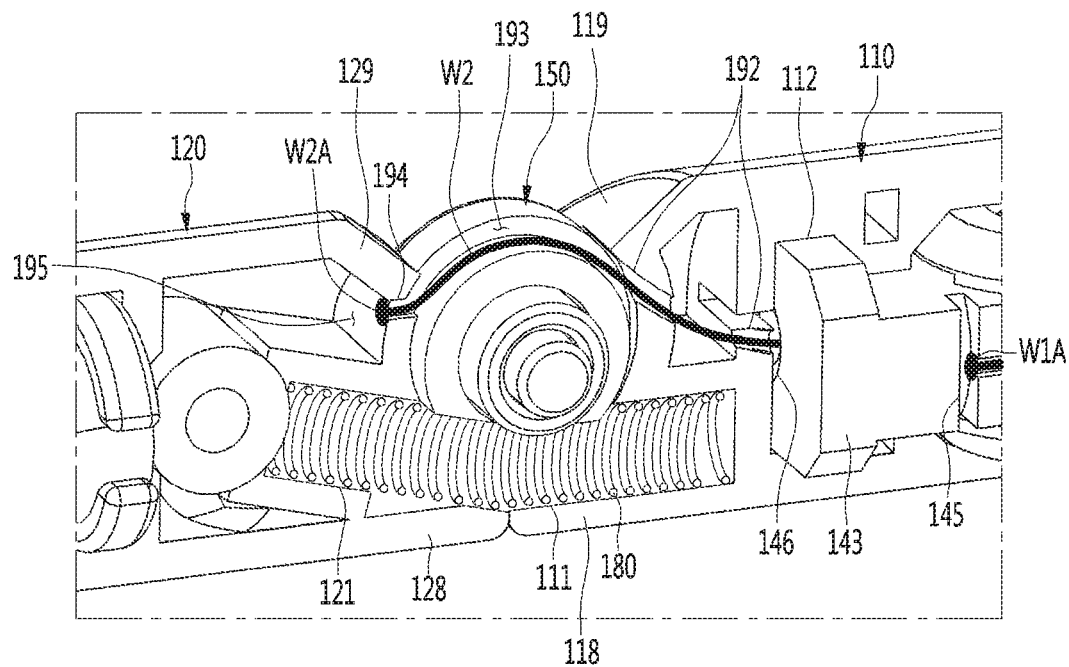
FIG. 15 is an enlarged view illustrating an elbow joint and a periphery of a second wire hook groove of the arm assembly of FIG. 13.

Referring to FIGS. 15 and 17, the elbow spring 180 may be similar to the shoulder spring 170 and may provide a restoring elastic force in a direction in which the elbow joint 150 is unfolded (i.e., the forearm 120 is not bended with respect to the upper arm 110). The elbow spring 180 may be referred to as a joint spring or an elastic member. The elbow spring 180 may have a substantially circular hollow cylinder shape. For example, the elbow spring 180 may have an integrated body made of an elastic material or may be a coil spring. However, embodiments disclosed are not limited to a coil spring configuration. For example, the elbow spring 180 may be an accordion spring or be made of a flexible or foam material.

The elbow spring 180 may be provided in the first elbow spring recess 111 and the second elbow spring recess 121. One end of the elbow spring 180 may be fitted in to the first elbow spring recess 111 and fixed to the upper arm 110 and the other end of the elbow spring 180 may be fitted in the second elbow spring recess 121 and fixed to the forearm 120.

When the elbow joint 150 rotates to fold the elbow joint 150, a tension of the second wire W2 may be increased to pull the forearm 120 toward the upper arm 110, and the elbow spring 180 may be elastically deformed and folded. When the driving assembly 121 removes the upward external force from the rod 280 so as to reduce tension in the second wire W2, a restoring elastic force of the elbow spring 180 may unfold the elbow joint 150 and push the forearm 120 away from the upper arm 110.

The end of the elbow spring 180 provided in the first elbow spring recess 111 may be maintained in to be in a fixed position, while the end of the elbow spring 170 provided in the second elbow spring recess 121 may rotate together with a movement of the forearm 120.

The first elbow spring recess 111 and the second elbow spring recess 121 may be formed outside of the elbow joint 150 so as not to interfere with a rotation at the elbow joint 150. The elbow spring 180 may be provided at an outer side of the elbow joint 150 with respect to a direction in which the elbow joint 150 is folded, and so the elbow spring 180 may bend or fold around the rotation axis of the elbow joint 150. Therefore, the elbow spring 180 may be extended and folded when the elbow joint 150 is folded. The first elbow spring recess 111 and the second elbow spring recess 121 may communicate with each other when the elbow joint 150 is unfolded, and may be spaced apart from each other when the elbow joint 10 is folded.

The upper arm 110 may include a first limiter or stopper 118, and the forearm 120 may include a second limiter or stopper 128. The first limiter 118 and the second limiter 128 may be formed as a tab or flange configured to limit a rotation range of the elbow joint 150.

The first limiter 118 may be formed at a bottom side of the elbow joint 150 below the first elbow spring recess 111. The second limiter 128 may be formed at the bottom side of the elbow joint 150 below the second elbow spring recess 121. The first limiter 118 and the second limiter 119 may be provided at an outer side of the elbow joint 150 so as to be provided below the elbow spring 180.

When the elbow joint 150 is unfolded completely, the first limiter 118 and the second limiter 119 may contact each other. When the elbow joint 150 is folded, the first limiter 118 and the second limiter 119 may be spaced apart from each other. As a result, a range of movement of the elbow joint 150 may be limited. The movement range may correspond to a movement range of a human elbow (e.g., 180 degrees).

The upper arm 110 may include an upper arm inclination or stopper 119, and the forearm 120 may include a forearm inclination or stopper 129. The upper arm inclination 119 may be inclined from an outer periphery of the upper arm 110 to an outer circumference of the elbow joint 150. The forearm inclination 129 may be inclined in a from an outer periphery of the forearm 120 toward the outer circumference of the elbow joint 150.

The upper arm inclination 119 and the forearm inclination 129 may be formed at an upper side of the elbow joint 150. The upper arm inclination 119 and the forearm inclined 129 may be provided at an inner side the elbow joint 150 with respect to a direction in which the elbow joint 150 is folded.

When the elbow joint 150 is folded, the upper arm inclination 119 and the forearm inclination 129 may be close to each other. When the elbow joint 150 is unfolded, the upper arm inclination 119 and the forearm inclination 129 may be spaced apart from each other, and a portion of the elbow joint 150 between the upper arm inclination 119 and the forearm inclination 129 may be visible from an outside of the action robot 1.

Referring to FIGS. 13-15 and 17, a third guide groove 192 may be defined in the upper arm 110 to guide a passage of the second wire W2. The third guide groove 192 may communicate with the first shoulder spring recess 146 defined in the first shoulder joint 140 and also with an inside or interior of the shoulder spring 170.

A fourth guide groove 193 (see also FIG. 11) may be defined in an outer circumferential surface of the elbow joint 150 to guide a passage of the second wire W2. The fourth guide groove 193 may communicate with the third guide groove 192.

A fifth guide groove 194 and a second wire hook groove 195 may be formed in at least one of the forearm 120 or the elbow joint 150. An example where the fifth guide groove 194 and the second wire hook groove 195 are formed in the forearm 120 will be described, but embodiments disclosed herein are not limited to such a configuration.

The fifth guide groove 194 may guide the second wire W2, and the second wire W2 may be hooked with the second wire hook groove 195 to fix the second wire W2 to the forearm 120 and/or the elbow joint 150. A tension of the second wire W2 may be transmitted around the second wire hook groove 195 so that, when the second wire W2 is pulled, the forearm 120 is pulled to rotate around the elbow joint 150.

The fifth guide groove 194 may communicate with the fourth guide groove 193 and a space between the forearm inclination 129 and the fourth guide groove 193.

The second wire hook groove 195 may be a predetermined space formed in the forearm 120 that communicates with the fifth guide groove 194. The second wire hook groove 195 may not visible from an outside of the action robot 1, improving aesthetics. A shape of the second wire hook groove 195 may be configured to receive a hook or cap W2A of the second wire W2.

The second wire W2 may be inserted into the second shoulder joint 160 through the wire inlet 165 to pass through the inside of the shoulder spring 170. The second wire W2 may be guided by being inserted into the third guide groove 192 and the fourth guide groove 193.

The hook W2A may be formed on an end of the second wire W2. As an example, the hook W2A may be formed by heating, dissolving, and hardening the end of the second wire W2 and/or bending the end. As another example, the hook W2A may be formed as a knot provided on the second wire W2. The hook W2A may have a thickness greater than that of the second wire W2.

The hook W2A may be provided in the second wire hook groove 195 and have a size configured to not pass through the fifth guide groove 194. When the second wire W2 is pulled, the hook W2A may be hooked in the second wire hook groove 195, and the second wire W2 may pull the forearm 120 such that the forearm 120 may pivot with respect to the upper arm 110.

A wire groove 163 may be formed in an outer circumference of the second shoulder joint 160 to receive the third wire W3. The wire groove 163 may extend in a circumferential direction of the second shoulder joint 160 so as to have a circular ring shape.

At least one third wire hook groove 163A may be defined in the wire groove 163 to communicate with the wire groove 163. A width of the hook groove 163A may be larger than that of the wire groove 163.

The third wire W3 may be inserted into and wound at least once around the wire groove 163. At least one hook or cap W3A may be formed in a middle of the third wire W3 between both ends of the third wire W3. Like the hooks W1A and W2A of the first and second wires W1 and W2, the hook W3A in the third wire W3 may, for example, be formed by heating, dissolving, and hardening a specific portion of the third wire W3, but embodiments disclosed herein are not limited hereto. As another example, the hook W3A may be a knot.

The third wire W3 may have a plurality of hooks W3A that correspond in number to a number of hook grooves 163A provided in the wire groove 163. A circumferential distance between each hook W3A may be equal or similar to a circumferential distance between hook grooves 163A so that the hooks W3A 163A may have positions corresponding to the hook grooves 163A and so that the hooks W3A are received and aligned in the hook grooves 163A.

The hook W3A may have a thickness greater than that of the third wire W3 and a size configured so as to not pass through the wire groove 163. When the third wire W3 is pulled downward, the hook W3A may be hooked with the third wire hook groove 163A, and the third wire W3 may pull the flange 162 of the second shoulder joint 160 to rotate the second shoulder joint 160 with respect to the main body 40 (see FIG. 2).

While a middle of the third wire W2 is coupled to the second shoulder joint 160 via the hook W3A and the hook groove 163A, one end of the third wire W3 may be connected to the auxiliary spring 299 (FIG. 6), and the other end may be connected to the third rod 280C (FIG. 7).

Hereinafter, an overall movement of the action robot 1 will be described with reference to FIGS. 6-8, 13, and 16-17. The elastic force of the first rod spring 290A on the first rod 280A may be stronger than that of the shoulder spring 170. When the drive assembly 21 does not push the first rod 280A upward, a restoring elastic force of the first rod spring 290A may push the first rod 280A down to pull the first wire W1 and deform (i.e., bend) the shoulder spring 170. The first wire W1 may be tensioned to pull the upper arm 110 inward or closer to the main body 40 to create a folding or bending action at the shoulder joint 140.

When the drive assembly 21 pushes the first rod 280A upward, the first rod 280A may ascend, and the first rod spring 290A may be compressed. A tension of the first wire W1 may be reduced with an upward movement of the first rod 280A, and the first wire W1 may not pull on the upper arm 110. A restoring elastic force of the shoulder spring 170 may push the upper arm 110 back outward or away from the main body 40 to create an unfolding or unbending action at the shoulder joint 140.

The elastic force of the second rod spring 290B on the second rod 280B may be stronger than that of the elbow spring 180. When the drive assembly 21 does not push the second rod 280B upward, a restoring elastic force of the second rod spring 290B may push the second rod 280B down to pull the second wire W2 and deform (i.e., bend) the elbow spring 180 The second wire W2 may be tensioned to pull the forearm 120 toward the upper arm 110 to create a folding or bending action at the elbow joint 180.

When the drive assembly pushes the second rod 280B upward, the second rod 280B may ascend, and the second rod spring 290B may be compressed. A tension of the second wire W2 may be reduced with an upward movement of the second rod 280B, and the second wire W2 may not pull on the forearm 120. A restoring elastic force of the elbow spring 180 may push the forearm 120 away from the upper arm 110 to create an unfolding or unbending action at the elbow joint 150.

The elastic force of the third rod spring 290C may be stronger than that of the auxiliary spring 299. When the drive assembly 21 does not push the third rod 280C upward, a restoring elastic force of the third rod spring 290C may push the third rod 280C downward to pull the third wire W3 down and expand or extend the auxiliary spring 299. The third wire W3 may be taut to pull on the second shoulder joint 160 (via the hook W3A and hook groove 163A) and also an end of the auxiliary spring 299 upward to expand the auxiliary spring 299. The third wire W3 may pull the second shoulder joint 160 to rotate the second shoulder joint 160 in a first direction (e.g., backward or counterclockwise when facing the second shoulder joint 160 of the right arm 100A). The first shoulder joint 140 and the upper arm 110 may rotate with a rotation of the second shoulder joint 160.

When the drive assembly 21 pushes the third rod 280C upward, the third rod 280C may ascend, and the third rod spring 290C may be compressed. As a tension of the third wire W3 is temporarily reduced, a restoring elastic force of the auxiliary spring 299 may pull the third wire W3 as the auxiliary spring 299 returns to a neutral state. The third wire W3 may again be taut and pull the second shoulder joint 160 to rotate the second shoulder joint 160 in a second direction opposite the first direction (e.g., forward or clockwise when facing the second shoulder joint of the right arm 100A). The first shoulder joint 140 and the upper arm 110 may rotate with a rotation of the second shoulder joint 160.

A movement of the action robot 1 may be exemplified by the below table:

| Motion | Rod 280 Movement | Rod Spring 290 State | Joint Spring (e.g., elbow spring 180, shoulder spring 170, auxiliary spring 299) State |
| --- | --- | --- | --- |
| Upper arm 110 lifted up and out (i.e., rotated about first shoulder joint axis X1) | Up | Compressed | Shoulder Spring 170 Natural |
| Upper arm 110 lowered down and in (i.e., rotated about first shoulder joint axis X1) | Down | Natural | Shoulder Spring 170 Deformed/Bent |
| Lower arm 120 straightened and unfolded away from upper arm 110 (i.e., rotated about elbow joint axis X2) | Up | Compressed | Elbow Spring 180 Natural |
| Lower arm 120 folded and bent toward upper arm 110 (i.e., rotated about elbow joint axis X2) | Down | Natural | Elbow Spring 180 Deformed/Bent |
| Upper arm 110 lifted up and forward (i.e., rotated about the second shoulder joint axis X3) | Up | Compressed | Auxiliary Spring 299 Natural |
| Upper arm 110 lowered down and back (i.e., rotated about the second shoulder joint axis X3) | Down | Natural | Auxiliary Spring 299 Expanded |

Embodiments disclosed herein may provide an action robot having a driving source or assembly provided outside of a main body, and a movable part or limb (e.g., an upper arm part and a forearm part) may be movable by a wire connected to an elevation rod. The action robot may be compact as compared with a case in which the driving source is provided in the main body.

The wire may be supported by a wire support to be tightly maintained and reduce or prevent entanglement between different wires. A joint elastic member or spring (e.g., a shoulder elastic member and an elbow elastic member) may provide an elastic force in a direction in which a joint (e.g., elbow joint, first shoulder joint, and second shoulder joint) is unfolded. The joint may be folded, bended, or rotated when the wire is not tensioned.

A rod elastic member or spring may provide a downward elastic force to the elevation rod connected to the wire. The elevation rod may descend by the elastic force of the rod elastic member to pull the wire, and the joint may be folded, bended, or rotated.

The elastic force of the rod elastic member may be stronger than the elastic force of the joint elastic member. When the driving source does not push the elevation rod upward, the elevation rod may descend by the elastic force of the rod elastic member, and the joint may be folded. When the driving source pushes the elevation rod upward, the joint may be unfolded, unbended, or rotated in an opposite direction by the elastic force of the joint elastic member. There may be an advantage in that the driving source may not need to pull the elevation rod.

The main body may include an upper body and a lower body that are detachably coupled to each other, facilitating maintenance inside the main body. At least one of the upper body or the lower body may include a front body and a rear body which are separably coupled to each other, facilitating maintenance inside the main body.

At least a portion of the elevation rod may be provided inside a leg or in the lower body. A space inside the leg or lower body may be utilized efficiently, and the action robot may be compact.

An inner frame may be provided inside the main body and may guide the elevation of the elevation rod. A structure of the action robot may be firm or stable, and the elevation rod may be smoothly or efficiently elevated without tipping or interference.

The rod elastic member may be contracted and stretched between an elastic member pressing part or flange provided on the elevation rod and the inner frame. The inner frame may not only guide the elevation of the elevation rod but also support the rod elastic member.

A hook or cap of the wire may be hooked with a hook groove defined in the elevation rod. The hook groove may be provided on the wire connector. The wire and the elevation rod may be easily connected to each other.

Since different wires may be respectively connected to the first shoulder joint, the elbow joint, and the second shoulder joint, each of the joints may move and be controlled independently. A rotation axis (left and right direction) of the second shoulder joint may be perpendicular to a rotation axis (front and rear direction) of the first shoulder joint. As a result, actions performed by the action robot may vary.

Both the ends of the wire connected to the second shoulder joint may be connected to n auxiliary elastic member and an elevation rod, respectively. The elastic force of the rod elastic member may be stronger than that of the auxiliary elastic member. When the driving source does not push the elevation rod upward, the elevation rod may descend by the elastic force of the rod elastic member, and the second shoulder joint may rotate in one direction. When the driving source pushes the elevation rod upward, the second shoulder joint may rotate by the elastic force of the auxiliary elastic member in the other direction.

In the case of one arm assembly (e.g., the right arm) connected to the main body, first and second wires connected to the first shoulder joint and the elbow joint may be provided on or in an opposite leg (e.g., the left leg). A third wire connected to the elevation rod and connected to the second shoulder joint may be connected to the elevation rod provided on a same leg (e.g., the right leg). The first and second wires may easily pull the arm assembly toward the main body, and the third wire may allow the arm assembly to easily rotate relative to the main body.

The third wire may be spaced apart from the wire support. An operation of the third wire may not interfere with the wire support and other wires fitted to the wire support.

A wire inlet through which the first wire and the second wire pass may be provided in the second shoulder joint. An appearance or view of the first wire and the second wire from an outside of the arm assembly may be minimized or obstructed. The first wire and the second wire may also be protected from external factors (e.g., external force or dust).

The first wire may pass between an outer circumference of a shoulder elastic member or spring and a guide groove, and the second wire may pass through an inside or interior of the shoulder elastic member. Paths of the first wire and the second wire may be separated from each other, and the first wire and the second wire may be prevented from being entangled inside the arm assembly or affecting the respective operations.

A first groove and a second groove into which the first wire and the second wire are respectively fitted may be defined or formed in the wire connector. The first groove and the second groove may be spaced apart from each other. The first and second wires may be prevented from being entangled in the main body or affecting the respective operations.

Embodiments disclosed herein may provide a compact action robot. Embodiments disclosed herein may also provide an action robot that is easily assembled and maintained.

Embodiments disclosed herein may provide an action robot that is capable of realizing multi-joint movement.

Embodiments disclosed herein may be implemented as an action robot that may include a joint configured so that a movable part or limb is rotatably connected to a main body, a joint configured to provide elastic or rotational force in a direction in which the joint is unfolded or rotated, a wire connected to the movable part to pull the movable part in a direction in which the joint is folded or rotated in an opposite direction, an elevation rod to which the wire is connected, a driving source or assembly (e.g., a motor or actuator) provided outside the main body and configured to lift the elevation rod, a rod spring configured to provide downward elastic force to the elevation rod, and a wire support provided within the main body and configured to support the wire. The elastic force of the rod spring may be stronger than that of the joint spring.

The main body may include an upper body and a lower body separably coupled to the upper body. The lower body may have a leg. At least one of the upper body or the lower body may include a front body and a rear body separably coupled to a rear side of the front body. At least a portion of the elevation rod may be provided inside the leg.

The action robot may further include an inner frame provided inside the main body and configured to guide an elevation of the elevation rod. A spring pressing part or flange may be expanded in a radial outward direction of the elevation rod. The rod spring may be stretched and contracted between the spring pressing part and the inner frame.

The action robot may further include a wire connector configured to connect the wire to the elevation rod. The wire connector may include a first part or top frame in which a through-hole through which the wire passes is defined. The first part may be provided above the elevation rod. The wire connector may include a second part or side frame which extends downward from the first part and is provided on an outer circumference of the elevation rod. A hook may be provided on the second part. A hook groove with which the hook is hooked may be defined or formed in the outer circumference of the elevation rod.

Embodiments disclosed herein may be implemented as an action robot including a first shoulder joint configured to allow an upper arm part to rotate with respect to a main body, an elbow joint configured to rotatably connect a forearm part to rotate allow the forearm part to rotate with respect to the upper arm part, a shoulder spring configured to provide elastic force in a direction in which the first shoulder joint is unfolded, an elbow spring configured to provide elastic force in a direction in which the elbow joint is unfolded, a first wire connected to the upper arm part or the first shoulder joint to pull the upper arm part or the first shoulder joint in a direction in which the first shoulder joint is folded, a second wire connected to the forearm part or the elbow joint to pull the forearm part or the elbow joint in a direction in which the elbow joint is folded, a first elevation rod to which the first wire is connected, a second elevation rod to which the second wire is connected, a first driving source or assembly provided outside the main body, the first driving source being configured to lift the first elevation rod, a second driving source or assembly provided outside the main body, the second driving source being configured to lift the second elevation rod, a first rod spring configured to provide downward elastic force to the first elevation rod, a second rod spring configured to provide downward elastic force to the second elevation rod, and a wire support provided inside the main body. The wire support may be configured to support at least one of the first wire or the second wire.

The elastic force of the first rod spring may be stronger than that of the shoulder spring. The elastic force of the second rod spring may be stronger than that of the elbow spring.

The action robot may further include a second shoulder joint rotatably connected to the main body. The second shoulder joint may be configured to connect the main body to the first shoulder joint. A rotation axis of the second shoulder joint may be perpendicular to that of the first shoulder joint.

The action robot may further include a third wire connected to the second shoulder joint, a third elevation rod to which one end of the third wire is connected, a third driving source configured to lift the third elevation rod, a third rod spring configured to provide downward elastic force to the third elevation rod, and an auxiliary spring configured to provide elastic force so that the other end of the third wire is pulled downward. The elastic force of the third rod spring may be stronger that of the auxiliary spring.

The main body may include an upper body and a lower body having a pair of legs. The lower body may be separably or detachably coupled to the upper body. At least one of the upper body or the lower body may include a front body and a rear body separably or detachably coupled to a rear side of the front body.

The main body may include an upper body and a lower body having a pair of legs. The lower body may be separably or detachably coupled to the upper body. The second shoulder joint may be connected to a left side of the upper body. At least a portion of each of the first elevation rod and the second elevation rod may be provided inside a right leg of the pair of legs. At least a portion of the third elevation rod may be provided inside a left leg of the pair of legs.

The main body may include an upper body and a lower body having a pair of legs. The lower body may be separably or detachably coupled to the upper body. The second shoulder joint may be connected to a right side of the upper body. At least a portion of each of the first elevation rod and the second elevation rod may be provided inside a left leg of the pair of legs. At least a portion of the third elevation rod may be provided inside a right leg of the pair of legs.

The third wire may be spaced apart from the wire support. The second shoulder joint may include a wire inlet through which the first wire and the second wire pass.

The second shoulder joint may further include a shoulder spring mounting part or recess which communicates with the wire inlet and into which the shoulder spring is inserted. The second shoulder joint may further include a guide groove communicating with the wire inlet. The guide groove may be covered by the shoulder spring.

The first wire may pass between an outer circumference of the shoulder spring and the guide groove. The second wire may pass through the inside of the shoulder spring. The wire support may comprise a first groove into which the first wire is inserted and a second groove which is spaced apart from the first groove and into which the second wire is inserted.

Embodiments disclosed herein may be implemented as a robot comprising a main body, a base to support the main body, a limb having upper and lower limbs, a joint provided between the upper limb and a lower limb, the lower limb being configured to rotate about the joint between a first position and a second position, a first spring provided inside of the limb, the first spring configured to be in a natural state when the lower limb is at the first position and in a deformed state when the lower limb is at the second position, a wire coupled to the lower limb to pull the lower limb toward the second position, a wire support provided in the main body to support the wire, the wire support having a groove in which the wire is placed, a rod provided in the main body and coupled to the wire, a drive assembly including at least one of a motor or an actuator provided in the base to move the rod in a first direction, and a second spring coupled to the rod. When the drive assembly is turned on, the rod may be moved in the first direction, the second spring may be compressed, and the lower limb may be rotated toward the first position via a restoring elastic force of the first spring. When the drive assembly is turned off, a restoring elastic force of the second spring may move the rod in a second direction opposite the first direction so that the wire pulls the lower limb toward the second position and the first spring is deformed.

The elastic force of the second spring may be stronger than that of the first spring. The limb may be an arm. The main body may include an upper body, the limb coupled to the upper body, and a lower body coupled to the upper body, the lower body having a leg. At least one of the upper body or the lower body may include a front body and a rear body coupled to a rear side of the front body. At least a portion of the rod may be provided inside the leg.

An inner frame may be provided inside the main body and configured to guide a movement of the rod in the first direction. A spring flange may be coupled to the rod to surround a portion of the rod in a radial direction of the rod. The second spring may be compressed between the spring flange and the inner frame when the rod is moved in the first direction.

A wire connector may be configured to connect the wire to the rod. The wire connector may include a first section provided above the rod and having a through-hole through which the wire passes, and a second section provided below the first section to surround the rod and having a hook. A hook groove may be formed along an outer circumference of the rod and is configured to receive the hook.

Embodiments disclosed herein may be implemented as a robot comprising a main body, a base to support the main body, a limb, a joint provided between the limb and the main body, the limb being configured to rotate about the joint between a first position and a second position, a first spring provided inside of the limb, the first spring configured to be in a natural state when the limb is at the first position and in a deformed state when the limb is at the second position, a wire coupled to the limb to pull the limb toward the second position, a wire support provided in the main body to support the wire, the wire support having a first groove in which the wire is placed, a rod provided in the main body and coupled to the wire, a drive assembly including at least one of a motor or an actuator provided in the base to move the rod in a first direction, and a second spring coupled to the rod. When the drive assembly is turned on, the rod may be moved in the first direction, the second spring may be compressed, and the limb may be rotated toward the first position via a restoring elastic force of the first spring. When the drive assembly is turned off, a restoring elastic force of the second spring may move the rod in a second direction opposite the first direction so that the wire pulls the limb toward the second position and the first spring is deformed.

The restoring elastic force provided by the second spring may be stronger than that of the first spring.

A secondary joint may be provided. The joint may be rotatably connected to the main body via the secondary joint such that the joint rotates about the secondary joint and such that a rotation axis of the joint is perpendicular to that of the secondary joint.

A secondary wire may have a first end and a second end. A section of the secondary wire between the first and second ends may be coupled to the secondary joint. A secondary rod may be coupled to the first end of the secondary wire. A secondary drive assembly may be configured to move the secondary rod in the first direction. A third spring may be coupled to the second end of the secondary wire. A fourth spring may be coupled to the secondary rod. When the secondary drive assembly is turned on, the secondary rod may be moved in the first direction, the fourth spring may be compressed, and the joint may be rotated in a first rotational direction by a restoring elastic force of the third spring. When the drive assembly is turned off, a restoring elastic force of the fourth spring may move the rod in the second direction, the joint may be rotated in a second rotational direction opposite the first rotation direction, and the third spring may be expanded. The elastic force of the fourth spring may be stronger that of the third spring.

The limb may be an arm. The main body may have a front side, a rear side, a left side, and a right side. The main body may include an upper body and a lower body coupled to the upper body. The lower body may have left and right legs provided at left and right sides of the main body, respectively. At least one of the upper body or the lower body may include a front frame and a rear frame coupled to the front frame at the rear side of the main body.

The secondary joint may be connected to the upper body at the left side of the main body, the rod may be at least partially provided in the right leg, and the secondary rod may be at least partially provided inside the left leg.

The secondary joint may be connected to the upper body at the right side of the main body, the rod may be at least partially provided inside the left leg, and the secondary rod may be at least partially provided inside the right leg.

The secondary joint may include a wire inlet through which the wire passes. The secondary joint may further include a first spring groove which communicates with the wire inlet and into which the first spring is inserted, and a wire groove communicating with the wire inlet and covered by the first spring.

The limb may include an upper limb, a lower limb, an intermediary joint provided between the upper and lower limbs, and a lower limb wire coupled to the lower limb to rotate the lower limb about the intermediary joint. The wire may pass between an outer circumference of the first spring and the wire groove. The lower limb wire may pass through the first spring. The wire support may include a second groove spaced apart from the first groove in which the lower limb wire is placed. The secondary wire may be spaced apart from the wire support.

Embodiments disclosed herein may be implemented as a robot comprising a main body, a base to support the main body, a limb, a joint provided between the limb and the main body, the joint being configured to rotate between a first position and a second position, a wire coupled to the joint, a first spring provided inside of the main body and coupled to the wire, the first spring configured to be in a natural state when the limb is at the first position and in an expanded state when the limb is at the second position, a rod provided in the main body and coupled to the wire, a drive assembly including at least one of a motor or an actuator provided in the base to move the rod in a first linear direction, and a second spring coupled to the rod. When the drive assembly is turned on, the rod may be moved in the first linear direction, the second spring may be compressed, and the wire may pull the joint so that the joint is rotated in a first rotational direction toward the first position via a restoring elastic force of the first spring. When the drive assembly is turned off, a restoring elastic force of the second spring may move the rod in a second linear direction opposite the first linear direction so that the wire pulls the joint so that the joint is rotated in a second rotational direction opposite the first rotational direction toward the second position and the first spring is expanded.

Embodiments disclosed herein may be implemented as a robot comprising a base configured to rotate around a vertical rotation axis, the base having first, second, and third driving assemblies, and a figurine fixed to the base so as to rotate with the base. The figurine may include a torso, a head coupled to a top of the torso, and at least one limb assembly. The limb assembly may include an upper limb coupled to the torso, a lower limb coupled to the upper limb, a first joint configured to pivot the upper limb with respect to the torso around a front-rear axis in a frontal plane of motion, the first joint having a first limb spring configured to be deformed when the upper limb pivots toward the torso, a second joint configured to pivot the lower limb with respect to the upper limb, the second joint having a second limb spring configured to be deformed when the lower limb pivots toward the upper limb, and a third joint configured to rotate the first joint around a left-right axis.

The figurine and/or the limb assembly may also include a first rod, a first rod spring connected to the first rod and having a greater spring constant than the first limb spring, and a first wire connected to the first rod and at least one of the first joint or the upper limb. When the first driving assembly is turned on, the rod may be moved upward, the first rod spring may be compressed, and the first limb spring may be released. When the first driving assembly is turned off, the first rod spring may be released, the first rod may be moved downward, and the first limb spring may be deformed.

The figurine and/or the limb assembly may also include a second rod, a second rod spring connected to the second rod and having a greater spring constant than the second limb spring, and a second wire connected to the second rod and at least one of the second joint or the lower limb. When the second driving assembly is turned on, the second rod may be moved upward, the second rod spring may be compressed, and the second limb spring may be released. When the second driving assembly is turned off, the second rod spring may be released, the second rod may be moved downward, and the second limb spring may be deformed.

The figurine and/or the limb assembly may also include an auxiliary spring, a third rod, a third rod spring connected to the third rod and having a greater spring constant than the auxiliary spring, and a third wire connected to the third rod and the auxiliary spring. When the third driving assembly is turned off, the third rod spring may be released, the third rod may be moved downward, and the auxiliary spring may be expanded. When the third driving assembly is turned on, the third rod may be moved upward, the third rod spring may be compressed, and the auxiliary spring may be released.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A robot comprising:
a main body;
a base to support the main body;
a limb having upper and lower limbs;
a joint provided between the upper limb and a lower limb, the lower limb being configured to rotate about the joint between a first position and a second position;
a first spring provided inside of the limb, the first spring configured to be in a natural state when the lower limb is at the first position and in a deformed state when the lower limb is at the second position;
a wire coupled to the lower limb to pull the lower limb toward the second position;
a wire support provided in the main body to support the wire, the wire support having a groove in which the wire is placed;
a rod provided in the main body and coupled to the wire;
a drive assembly including at least one of a motor or an actuator provided in the base to move the rod in a first direction; and
a second spring coupled to the rod, wherein,
when the drive assembly is turned on, the rod is moved in the first direction, the second spring is compressed, and the lower limb is rotated toward the first position via a restoring elastic force of the first spring, and
when the drive assembly is turned off, a restoring elastic force of the second spring moves the rod in a second direction opposite the first direction so that the wire pulls the lower limb toward the second position and the first spring is deformed.

2. The robot according to claim 1, wherein the elastic force of the second spring is stronger than that of the first spring.

3. The robot according to claim 1, wherein the limb is an arm and the main body comprises:
an upper body, the limb coupled to the upper body; and
a lower body coupled to the upper body, the lower body having a leg, wherein at least one of the upper body or the lower body includes:
a front body; and
a rear body coupled to a rear side of the front body.

4. The robot according to claim 3, wherein at least a portion of the rod is provided inside the leg.

5. The robot according to claim 1, further comprising an inner frame provided inside the main body and configured to guide a movement of the rod in the first direction.

6. The robot according to claim 5, wherein a spring flange is coupled to the rod to surround a portion of the rod in a radial direction of the rod, and the second spring is compressed between the spring flange and the inner frame when the rod is moved in the first direction.

7. The robot according to claim 1, further comprising a wire connector configured to connect the wire to the rod, wherein the wire connector comprises:
a first section provided above the rod and having a through-hole through which the wire passes; and
a second section provided below the first section to surround the rod and having a hook,
wherein a hook groove is formed along an outer circumference of the rod and is configured to receive the hook.

8. A robot comprising:
a main body;
a base to support the main body;
a limb;
a joint provided between the limb and the main body, the limb being configured to rotate about the joint between a first position and a second position;
a first spring provided inside of the limb, the first spring configured to be in a natural state when the limb is at the first position and in a deformed state when the limb is at the second position;
a wire coupled to the limb to pull the limb toward the second position;
a wire support provided in the main body to support the wire, the wire support having a first groove in which the wire is placed;
a rod provided in the main body and coupled to the wire;
a drive assembly including at least one of a motor or an actuator provided in the base to move the rod in a first direction; and
a second spring coupled to the rod, wherein, when the drive assembly is turned on, the rod is moved in the first direction, the second spring is compressed, and the limb is rotated toward the first position via a restoring elastic force of the first spring, and when the drive assembly is turned off, a restoring elastic force of the second spring moves the rod in a second direction opposite the first direction so that the wire pulls the limb toward the second position and the first spring is deformed.

9. The robot according to claim 8, wherein the restoring elastic force provided by the second spring is stronger than that of the first spring.

10. The robot according to claim 8, further comprising a secondary joint, the joint being rotatably connected to the main body via the secondary joint such that the joint rotates about the secondary joint and such that a rotation axis of the joint is perpendicular to that of the secondary joint.

11. The robot according to claim 10, further comprising:
a secondary wire having a first end and a second end, a section of the secondary wire between the first and second ends being coupled to the secondary joint;
a secondary rod coupled to the first end of the secondary wire;
a secondary drive assembly configured to move the secondary rod in the first direction;
a third spring coupled to the second end of the secondary wire;
a fourth spring coupled to the secondary rod, wherein, when the secondary drive assembly is turned on, the secondary rod is moved in the first direction, the fourth spring is compressed, and the joint is rotated in a first rotational direction by a restoring elastic force of the third spring, and when the drive assembly is turned off, a restoring elastic force of the fourth spring moves the secondary rod in the second direction, the joint is rotated in a second rotational direction opposite the first rotation direction, and the third spring is expanded.

12. The robot according to claim 11, wherein the elastic force of the fourth spring is stronger that of the third spring.

13. The robot according to claim 11, wherein the limb is an arm and the main body comprises:
a front side, a rear side, a left side, and a right side;
an upper body; and
a lower body coupled to the upper body and having left and right legs provided at left and right sides of the main body, respectively, wherein at least one of the upper body or the lower body comprises:
a front frame; and
a rear frame coupled to the front frame at the rear side of the main body.

14. The robot according to claim 13, wherein the secondary joint is connected to the upper body at the left side of the main body, the rod is at least partially provided in the right leg, and the secondary rod is at least partially provided inside the left leg.

15. The robot according to claim 13, wherein the secondary joint is connected to the upper body at the right side of the main body, the rod is at least partially provided inside the left leg, and the secondary rod is at least partially provided inside the right leg.

16. The robot according to claim 10, wherein the secondary joint comprises a wire inlet through which the wire passes.

17. The robot according to claim 16, wherein the secondary joint further comprises:

a first spring groove which communicates with the wire inlet and into which the first spring is inserted; and
a wire groove communicating with the wire inlet and covered by the first spring.

18. The robot according to claim 17, wherein the limb includes an upper limb, a lower limb, an intermediary joint provided between the upper and lower limbs, and a lower limb wire coupled to the lower limb to rotate the lower limb about the intermediary joint, wherein the wire passes between an outer circumference of the first spring and the wire groove and the lower limb wire passes through the first spring, and wherein the wire support includes a second groove spaced apart from the first groove in which the lower limb wire is placed.

19. The robot according to claim 17, wherein the secondary wire is spaced apart from the wire support.

20. A robot, comprising:
a base configured to rotate around a vertical rotation axis, the base having first, second, and third driving assemblies; and
a figurine fixed to the base so as to rotate with the base, the figurine including:
a torso;
a head coupled to a top of the torso; and
at least one limb assembly, the limb assembly having:
an upper limb coupled to the torso;
a lower limb coupled to the upper limb;
a first joint configured to pivot the upper limb with respect to the torso around a front-rear axis in a frontal plane of motion, the first joint having a first limb spring configured to be deformed when the upper limb pivots toward the torso;
a second joint configured to pivot the lower limb with respect to the upper limb, the second joint having a second limb spring configured to be deformed when the lower limb pivots toward the upper limb;
a third joint configured to rotate the first joint around a left-right axis;
a first rod, a first rod spring connected to the first rod and having a greater spring constant than the first limb spring, a first wire connected to the first rod and at least one of the first joint or the upper limb, wherein, when the first driving assembly is turned on, the rod is moved upward, the first rod spring is compressed, and the first limb spring is released, and when the first driving assembly is turned off, the first rod spring is released, the first rod is moved downward, and the first limb spring is deformed;
a second rod, a second rod spring connected to the second rod and having a greater spring constant than the second limb spring, and a second wire connected to the second rod and at least one of the second joint or the lower limb, wherein, when the second driving assembly is turned on, the second rod is moved upward, the second rod spring is compressed, and the second limb spring is released, and when the second driving assembly is turned off, the second rod spring is released, the second rod is moved downward, and the second limb spring is deformed; and
an auxiliary spring, a third rod, a third rod spring connected to the third rod and having a greater spring constant than the auxiliary spring, and a third wire connected to the third rod and the auxiliary spring and configured to rotate the third joint, wherein, when the third driving assembly is turned off, the third rod spring is released, the third rod is moved downward, and the auxiliary spring is expanded, and when the third driving assembly is turned on, the third rod is moved upward, the third rod spring is compressed, and the auxiliary spring is released.

\* \* \* \* \*